United States Patent
Xu et al.

(10) Patent No.: US 11,526,809 B2
(45) Date of Patent: *Dec. 13, 2022

(54) PRIMARY KEY-FOREIGN KEY RELATIONSHIP DETERMINATION THROUGH MACHINE LEARNING

(71) Applicant: Hitachi Vantara LLC, Santa Clara, CA (US)

(72) Inventors: Yongming Xu, White Plains, NY (US); Ram Dayal Goyal, Bangalore (IN)

(73) Assignee: HITACHI VANTARA LLC, Santa Clara, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/900,253

(22) Filed: Jun. 12, 2020

(65) Prior Publication Data

US 2020/0311608 A1 Oct. 1, 2020

Related U.S. Application Data

(63) Continuation of application No. 15/210,889, filed on Jul. 15, 2016, now Pat. No. 10,692,015.

(51) Int. Cl.
*G06N 20/00* (2019.01)
*G06F 16/21* (2019.01)

(52) U.S. Cl.
CPC .......... *G06N 20/00* (2019.01); *G06F 16/211* (2019.01)

(58) Field of Classification Search
CPC ...... G06F 16/211; G06N 20/00; G06N 20/10; G06N 20/20; G06N 7/005
See application file for complete search history.

(56) References Cited

U.S. PATENT DOCUMENTS

| | | |
|---|---|---|
| 5,970,490 A | 10/1999 | Morgenstern |
| 6,044,374 A | 3/2000 | Nesamoney et al. |
| 6,535,868 B1 | 3/2003 | Galeazzi et al. |
| 6,697,808 B1 | 2/2004 | Hurwood et al. |
| 6,957,225 B1 | 10/2005 | Zait et al. |
| 7,013,310 B2 | 3/2006 | Messing et al. |
| 7,389,314 B2 | 6/2008 | Kulkarni et al. |
| 7,647,293 B2 | 1/2010 | Brown et al. |
| 7,702,636 B1 | 4/2010 | Sholtis et al. |

(Continued)

FOREIGN PATENT DOCUMENTS

| | | |
|---|---|---|
| EP | 2469423 A1 | 6/2012 |
| EP | 2916246 A1 | 9/2015 |
| EP | 2975535 A1 | 1/2016 |

OTHER PUBLICATIONS

Tsymbal et al., "Dynamic Integration with Random Forests", 2006, ECML 2006: Machine Learning: ECML, pp. 801-808 (Year: 2006).*

(Continued)

*Primary Examiner* — Brent Johnston Hoover
(74) *Attorney, Agent, or Firm* — Mattingly & Malur, PC

(57) ABSTRACT

A system and method for determining a relationship among data sets. The method includes selecting a first data set from a first table, and a second data set from a second table, forming an inclusion dependency pair of data based on the selected first data set and the selected second data set, determining a resultant of the inclusion dependency pair, and determining a primary key-foreign key relationship between the first data set and the second data set based on the determined resultant.

18 Claims, 26 Drawing Sheets

(56) References Cited

U.S. PATENT DOCUMENTS

| | | |
|---|---|---|
| 7,743,078 B2 | 6/2010 | Azvine et al. |
| 7,774,378 B2 | 8/2010 | Nelson |
| 7,792,857 B1 | 9/2010 | Brette et al. |
| 8,135,691 B2 | 3/2012 | Majd et al. |
| 8,176,002 B2 | 5/2012 | Murphy et al. |
| 8,364,617 B2 | 1/2013 | Laxman et al. |
| 8,386,529 B2 | 2/2013 | Chaudhuri et al. |
| 8,768,967 B2 | 7/2014 | Abrams et al. |
| 8,924,429 B1 | 12/2014 | Fisher et al. |
| 2002/0103793 A1 | 8/2002 | Koller et al. |
| 2005/0071359 A1 | 3/2005 | Elandassery et al. |
| 2006/0195492 A1 | 8/2006 | Clark et al. |
| 2007/0156792 A1 | 7/2007 | D'Souza et al. |
| 2007/0214179 A1 | 9/2007 | Hoang |
| 2007/0282784 A1 | 12/2007 | Modani et al. |
| 2008/0140696 A1 | 6/2008 | Mathuria |
| 2008/0222192 A1 | 9/2008 | Hughes |
| 2009/0106242 A1 | 4/2009 | McGrew et al. |
| 2010/0287158 A1 | 11/2010 | Toledano et al. |
| 2011/0246432 A1 | 10/2011 | Yang et al. |
| 2012/0123978 A1 | 5/2012 | Toderice et al. |
| 2012/0254103 A1 | 10/2012 | Cottle et al. |
| 2013/0036117 A1 | 2/2013 | Fisher et al. |
| 2013/0086104 A1 | 4/2013 | Morrison et al. |
| 2013/0151491 A1 | 6/2013 | Gislason |
| 2013/0226940 A1 | 8/2013 | Gorelik et al. |
| 2014/0032617 A1 | 1/2014 | Stanfill |
| 2014/0089255 A1 | 3/2014 | Pejathaya et al. |
| 2014/0280151 A1 | 9/2014 | Micaelian |
| 2014/0372346 A1 | 12/2014 | Phillipps et al. |
| 2015/0088834 A1 | 3/2015 | Wright |
| 2015/0271267 A1 | 9/2015 | Solis et al. |
| 2016/0034478 A1 | 2/2016 | Hernandez-Sherrington et al. |
| 2016/0098645 A1 | 4/2016 | Sharma et al. |
| 2016/0132787 A1* | 5/2016 | Drevo .................. G06N 20/10 706/12 |
| 2016/0224642 A1 | 8/2016 | Miller et al. |
| 2017/0308602 A1 | 10/2017 | Raghunathan et al. |

OTHER PUBLICATIONS

Zhang et al., "On Multi-Column Foreign Key Discovery", 2010, Proceedings of the VLDB Endowment, vol. 3, No. 1, pp. 805-814. (Year: 2010).*

The First Examination Report for Indian Patent Application No. 201947005997, dated Jan. 25, 2021, Intellectual Property Office in India, Chennai, India.

"WebCenter Content Application Administrator's Guide for Content Server—2. Managing Repository Content", Oracle Fusion Middleware Online Documentation Library, 11g Release 1 (11.1.1.6), pp. 1-29, https://docs.oracle.com/cd/E11882_01/owb.112/e17130/change_mgmt.htm#WBINS16232.

Albrecht, et al., "A Machine Learning Approach to Foreign Key Discovery", 12th International Workshop on the Web and DataBases, 200, Germany.

Bernstein et al., "An Overview of Repository Technology," pp. 705-713, Proceedings of the 20th VLDB Conference, Santiago Chile.

Ellkvist et al., Using Provenance to Support Real-Time Collaborative Design of Workflows, pp. 266-279, Provenance and Annotation of Data and Processes, Second International Provenance and Annotation Workshop, IPAW 2008, Salt Lake City, UT, USA, Jun. 17-18, 2008.

Rostin, et al., "A Machine Learning Approach to Foreign Key Discovery" Germany, pp. 1-6. 12th International Workshop on the Web and Databases (WebDB 2009).

The European Extended Search Report for European Patent Application 17828157.2, dated Jan. 7, 2020, EPO, The Hague.

The Examination Report for GB 17771543.0, dated Feb. 20, 2020, EPO, Munich, Germany.

The International Search Report and the Written Opinion of the International Searching Authority for PCT/US2017/038882, dated Oct. 26, 2017, ISA/RU, Moscow, Russia.

The International Search Report and Written Opinion, PCT/GB2017/052713, dated Nov. 28, 2017, 14 pages, EPO, Rijswijk.

The International Search Report and Written Opinion, PCT/GB2017/052714, dated Nov. 8, 2017, 14 pages, EPO, Rijswijk.

The International Search Report and Written Opinion, PCT/GB2017/052715, dated Dec. 14, 2017, 13 pages, EPO, Rijswijk.

The International Search Report and Written Opinion, PCT/IB2018/000931, dated Apr. 16, 2020, pages, ISA/RU, Moscow, Russia.

Warehouse Builder Installation and Administration Guide—12. Importing, Exporting, an Upgrading Metadata, Oracle Database Online Documentation 11g Release 2 (11.2), pp. 1-23, https://docs.oracle.com/cd/E11882_01/owb.112/e17130/change_mgmt.htm.

* cited by examiner

| INSTANCE | ACTUAL RESULT | M-1 | M-2 | ......... | M-20 | YES COUNT | %YES |
|---|---|---|---|---|---|---|---|
| 1 | Y | Y | Y | .. | N | 12 | 60 |
| 2 | N | Y | Y | .. | N | 4 | 20 |
| 3 | Y | Y | Y | .. | N | 5 | 25 |
| .. | Y | N | Y | .. | Y | 10 | 50 |
| .. | N | N | N | .. | Y | 2 | 10 |
| 1200 | Y | Y | N | .. | Y | 14 | 70 |

FIG. 5

| % YES | YES COUNT | COUNT ACTUAL "YES" | COUNT ACTUAL "NO" |
|---|---|---|---|
| 100 | 5 | 4 | 1 |
| 99 | 0 | 0 | 0 |
| 98 | 0 | 0 | 0 |
| . | 0 | 0 | 0 |
| . | 0 | 0 | 0 |
| 50 | 220 | 70 | 150 |
| . | 0 | 0 | 0 |
| . | 0 | 0 | 0 |
| . | 0 | 0 | 0 |
| 2 | 0 | 0 | 0 |
| 1 | 0 | 0 | 0 |
| 0 | 1200 | 50 | 1150 |

FIG. 6

| % YES | YES COUNT | COUNT ACTUAL "YES" | COUNT ACTUAL "NO" | CUMULATIVE "YES" | CUMULATIVE "NO" |
|---|---|---|---|---|---|
| 100 | 5 | 4 | 1 | 4 | 1 |
| 99 | 0 | 0 | 0 | 4 | 1 |
| 98 | 0 | 0 | 0 | 4 | 1 |
| . | 0 | 0 | 0 | 4 | 1 |
| . | 0 | 0 | 0 | 4 | 1 |
| 50 | 220 | 70 | 150 | 74 | 151 |
| . | 0 | 0 | 0 | 74 | 151 |
| . | 0 | 0 | 0 | 74 | 151 |
| . | 0 | 0 | 0 | 74 | 151 |
| 2 | 0 | 0 | 0 | 74 | 151 |
| 1 | 0 | 0 | 0 | 74 | 151 |
| 0 | 1200 | 50 | 1150 | 124 | 1301 |

TABLE T1

| EMP_ID | EMP_FIRST_NAME | SURNAME | DATE OF JOINING | YEARS OF EXP |
|---|---|---|---|---|
| 1 | ROBERT | JOSEPH | MAY 10, 2013 | 5 |
| 2 | SUSANNE | LEE | MAY 12, 2013 | 7 |
| 3 | GEORGE | WALTER | JUNE 10, 2013 | 12 |
| 4 | TOM | CRATE | JUNE 15, 2013 | 7 |
| 5 | JOHN | WELCH | JULY 04, 2013 | 8 |
| 6 | LUCY | MARGARET | JULY 05, 2013 | 9 |
| 7 | PETER | WARREN | JULY 20, 2013 | 15 |

TABLE T2

| CHECKUP_ID | EMP_CODE | CHECKUP-DATE | NO. OF TESTS |
|---|---|---|---|
| 12 | 2 | AUG 12, 2013 | 6 |
| 13 | 3 | AUG 12, 2013 | 5 |
| 14 | 5 | AUG 13, 2013 | 7 |
| 15 | 6 | AUG 13, 2013 | 8 |

| ID | TABLE_NAME_P | COLUMN_NAME_P | TABLE_NAME_D | COLUMN_NAME_D | PK-FK FLAG |
|---|---|---|---|---|---|
| 1 | CREDITCARD | CREDITCARDID | PERSONCREDITCARD | CREDITCARDID | Y |
| 2 | ADDRESS | ADDRESSID | BUSINESSENTITYADDRESS | ADDRESSID | Y |
| 3 | ADDRESS | ADDRESSID | SALESORDERHEADER | BILLTOADDRESSID | Y |
| 4 | ADDRESS | ADDRESSID | SALESORDERHEADER | SHIPTOADDRESSID | Y |
| 5 | BUSINESSENTITYCONTACT | ADDRESSID | WORKORDERROUTING | OPERATIONSEQUENCE | N |
| 6 | CONTACTTYPE | CONTACTTYPEID | ADDRESSTYPE | ADDRESSTYPEID | N |
| 7 | CONTACTTYPE | CONTACTTYPEID | BUSINESSENTITYADDRESS | ADDRESSTYPEID | N |
| 8 | BUSINESSENTITY | BUSINESSENTITYID | BUSINESSENTITYADDRESS | BUSINESSENTITYID | Y |
| 9 | BUSINESSENTITY | BUSINESSENTITYID | STORE | BUSINESSENTITYID | Y |
| 10 | CONTACTTYPE | CONTACTTYPEID | CREDITCARD | EXPMONTH | N |
| 11 | EMPLOYEE | BUSINESSENTITYID | EMPLOYEEDEPARTMENTHISTORY | BUSINESSENTITYID | Y |
| 12 | EMPLOYEE | BUSINESSENTITYID | EMPLOYEEPAYHISTORY | BUSINESSENTITYID | Y |
| 13 | LOCATION | LOCATIONID | PRODUCTINVENTORY | LOCATIONID | Y |
| 14 | LOCATION | LOCATIONID | WORKORDERROUTING | LOCATIONID | Y |
| 15 | PERSON | BUSINESSENTITYID | PASSWORD | BUSINESSENTITYID | Y |
| .. | .. | .. | .. | .. | .. |
| .. | .. | .. | .. | .. | .. |
| .. | .. | .. | .. | .. | .. |
| .. | .. | .. | .. | .. | .. |
| 1627 | SALESPERSON | BUSINESSENTITYID | STORE | SALESPERSONID | Y |
| 1628 | CONTACTTYPE | CONTACTTYPEID | PRODUCTSUBCATEGORY | PRODUCTCATEGORYID | N |

FIG. 11

| ID | TABLE_NAME_P | COLUMN_NAME_P | TABLE_NAME_D | COLUMN_NAME_D | PK-FK FLAG |
|---|---|---|---|---|---|
| 100001 | H_CUSTOMER | C_CUSTKEY | H_LINEITEM | L_LINENUMBER | N |
| 100002 | H_CUSTOMER | C_CUSTKEY | H_LINEITEM | L_QUANTITY | N |
| 100003 | H_CUSTOMER | C_CUSTKEY | H_LINEITEM | L_SUPPKEY | N |
| 100004 | H_CUSTOMER | C_CUSTKEY | H_ORDER | O_CUSTKEY | Y |
| 100005 | H_CUSTOMER | C_CUSTKEY | H_PART | P_SIZE | N |
| 100006 | H_CUSTOMER | C_CUSTKEY | H_PARTSUPP | PS_SUPPKEY | N |
| 100007 | H_CUSTOMER | C_CUSTKEY | H_SUPPLIER | S_SUPPKEY | N |
| 100008 | H_CUSTOMER | C_CUSTKEY | H_PARTSUPP | PS_AVAILQTY | N |
| 100009 | H_NATION | N_NATIONKEY | H_CUSTOMER | C_NATIONKEY | Y |
| 100010 | H_NATION | N_NATIONKEY | H_LINEITEM | L_LINENUMBER | N |
| .. | .. | .. | .. | .. | .. |
| .. | .. | .. | .. | .. | .. |
| .. | .. | .. | .. | .. | .. |
| 100579 | CUSTOMERS | CUST_ID | TIMES | WEEK_ENDING_DAY_ID | N |
| 100580 | PERSON | BUSINESSENTITYID | PERSONPHONE | BUSINESSENTITYID | Y |

| ID | TABLE_NAME_P | COLUMN_NAME_P | TABLE_NAME_D | COLUMN_NAME_D | FEATURE 1 | FEATURE 2 | FEATURE 3 | FEATURE 4 | FEATURE 5 | FEATURE 6 | FEATURE 7 | PK-FK FLAG |
|---|---|---|---|---|---|---|---|---|---|---|---|---|
| 1 | CREDITCARD | CREDITCARDID | PERSONCREDITCARD | CREDITCARDID | 0.6540 | 0.2982 | 0.3971 | 1 | 1.0000 | 0.987988 | 0.1940 | Y |
| 2 | ADDRESS | ADDRESSID | BUSINESSENTITYADDRESS | ADDRESSID | 0.9350 | 0.7645 | 0.5012 | 1 | 1.0000 | 0.550551 | 0.6570 | Y |
| 3 | ADDRESS | ADDRESSID | SALESORDERHEADER | BILLTOADDRESSID | 0.6790 | 0.0755 | 0.5287 | 1 | 0.6000 | 0.330330 | 0.5290 | Y |
| 4 | ADDRESS | ADDRESSID | SALESORDERHEADER | SHIPTOADDRESSID | 0.5800 | 0.3020 | 0.8051 | 1 | 0.6000 | 0.911912 | 0.4460 | Y |
| 5 | BUSINESSENTITY | BUSINESSENTITYID | BUSINESSENTITYADDRESS | BUSINESSENTITYID | 0.7910 | 0.9888 | 0.5378 | 1 | 1.0000 | 0.636637 | 0.2470 | Y |
| 6 | BUSINESSENTITY | BUSINESSENTITYID | STORE | BUSINESSENTITYID | 0.7710 | 0.9278 | 0.6050 | 1 | 1.0000 | 0.144144 | 0.2450 | Y |
| 7 | EMPLOYEE | BUSINESSENTITYID | EMPLOYEEDEPARTMENTHISTORY | BUSINESSENTITYID | 0.6000 | 0.9829 | 0.7630 | 1 | 1.0000 | 0.818819 | 0.4490 | Y |
| 8 | EMPLOYEE | BUSINESSENTITYID | EMPLOYEEPAYHISTORY | BUSINESSENTITYID | 0.9900 | 0.2831 | 0.7969 | 1 | 1.0000 | 0.417417 | 0.5630 | Y |

FIG. 14A

| ID | TABLE_NAME_P | COLUMN_NAME_P | TABLE_NAME_D | COLUMN_NAME_D | FEATURE 1 | FEATURE 2 | FEATURE 3 | FEATURE 4 | FEATURE 5 | FEATURE 6 | FEATURE 7 | PK-FK FLAG |
|---|---|---|---|---|---|---|---|---|---|---|---|---|
| 9 | LOCATION | LOCATIONID | PRODUCTINVENTORY | LOCATIONID | 0.9010 | 0.6981 | 0.8713 | 1 | 1.0000 | 0.821822 | 0.1350 | Y |
| .. | .. | .. | .. | .. | .. | .. | .. | .. | .. | .. | .. | .. |
| .. | .. | .. | .. | .. | .. | .. | .. | .. | .. | .. | .. | .. |
| 1626 | PERSON | BUSINESSENTITYID | SALESTERRITORY | STATEPROVINCEID | 0.8530 | 0.8572 | 0.5580 | 1 | 0.1875 | 0.101101 | 0.5870 | N |
| 1627 | PERSON | BUSINESSENTITYID | SALESTERRITORYHISTORY | TERRITORYID | 0.9580 | 0.7164 | 0.6881 | 1 | 0.3125 | 0.159159 | 0.4370 | N |
| 1628 | PERSON | BUSINESSENTITYID | SHIPMETHOD | SHIPMETHODID | 0.8860 | 0.1402 | 0.9442 | 1 | 0.3125 | 0.827828 | 0.9410 | N |

| ID | TABLE_NAME_P | COLUMN_NAME_P | TABLE_NAME_D | COLUMN_NAME_D | FEATURE 1 | FEATURE 2 | FEATURE 3 | FEATURE 4 | FEATURE 5 | FEATURE 6 | FEATURE 7 | PK-FK FLAG |
|---|---|---|---|---|---|---|---|---|---|---|---|---|
| 100001 | H_CUSTOMER | C_CUSTKEY | H_LINEITEM | L_LINENUMBER | 0.6527 | 0.9678 | 0.6022 | 0 | 0.166667 | 0.332332 | 0.6950 | N |
| 100002 | H_CUSTOMER | C_CUSTKEY | H_LINEITEM | L_QUANTITY | 0.5810 | 0.8741 | 0.5958 | 0 | 0.4 | 0.291291 | 0.8550 | N |
| 100003 | H_CUSTOMER | C_CUSTKEY | H_LINEITEM | L_SUPPKEY | 0.9650 | 0.2106 | 0.2903 | 1 | 0.555556 | 0.835836 | 0.5580 | N |
| 100004 | H_CUSTOMER | C_CUSTKEY | H_ORDER | O_CUSTKEY | 0.6070 | 0.0287 | 0.0937 | 1 | 0.888889 | 0.647648 | 0.3450 | Y |
| 100005 | H_CUSTOMER | C_CUSTKEY | H_PART | P_SIZE | 0.7420 | 0.2240 | 0.3106 | 0 | 0.333333 | 0.495495 | 0.4100 | N |
| 100006 | H_CUSTOMER | C_CUSTKEY | H_PARTSUPP | PS_SUPPKEY | 0.7660 | 0.3911 | 0.0890 | 1 | 0.5 | 0.337337 | 0.5910 | N |
| 100007 | H_CUSTOMER | C_CUSTKEY | H_SUPPLIER | S_SUPPKEY | 0.9650 | 0.5833 | 0.2477 | 1 | 0.555556 | 0.362362 | 0.6870 | N |
| 100008 | H_CUSTOMER | C_CUSTKEY | H_PARTSUPP | PS_AVAILQTY | 0.8810 | 0.0361 | 0.0029 | 0 | 0.181818 | 0.976977 | 0.4560 | N |

FIG. 15A

| ID | TABLE_NAME_P | COLUMN_NAME_P | TABLE_NAME_D | COLUMN_NAME_D | FEATURE 1 | FEATURE 2 | FEATURE 3 | FEATURE 4 | FEATURE 5 | FEATURE 6 | FEATURE 7 | PK-FK FLAG |
|---|---|---|---|---|---|---|---|---|---|---|---|---|
| 100009 | H_NATION | N_NATIONKEY | H_CUSTOMER | C_NATIONKEY | 0.7260 | 0.2134 | 0.3601 | 1 | 0.909091 | 0.222222 | 0.3430 | Y |
| 100010 | H_NATION | N_NATIONKEY | H_LINEITEM | L_LINENUMBER | 0.6290 | 0.8268 | 0.5708 | 0 | 0.166667 | 0.359359 | 0.4570 | N |
| 100011 | H_NATION | N_NATIONKEY | H_ORDER | O_SHIPPRIORITY | 0.8040 | 0.1791 | 0.5491 | 0 | 0.285714 | 0.5655660 | 0.4520 | N |
| 100012 | H_NATION | N_NATIONKEY | H_REGION | R_REGIONKEY | 0.7390 | 0.7211 | 0.5492 | 1 | 0.636364 | 0.814815 | 0.6140 | N |
| .. | .. | .. | .. | .. | .. | .. | .. | .. | .. | .. | .. | .. |
| .. | .. | .. | .. | .. | .. | .. | .. | .. | .. | .. | .. | .. |
| .. | .. | .. | .. | .. | .. | .. | .. | .. | .. | .. | .. | .. |
| 100579 | TRANSACTIONHISTORYARCHIVE | TRANSACTIONID | WORKORDER | PRODUCTID | 0.9300 | 0.4583 | 0.3616 | 1 | 0.384615 | 0.560561 | 0.7460 | N |
| 100580 | WORKORDER | WORKORDERID | BUSINESSENTITYADDRESS | ADDRESSTYPEID | 0.6530 | 0.6776 | 0.3851 | 1 | 0.230769 | 0.745746 | 0.5530 | N |

FIG. 15B

| ID | ACTUAL PK-FK FLAG | M1 | M2 | M3 | M4 | M5 | M6 | M7 | M8 | M9 | M10 | YES COUNT | %YES |
|---|---|---|---|---|---|---|---|---|---|---|---|---|---|
| 100001 | N | N | N | Y | Y | N | N | N | Y | N | N | 3 | 30 |
| 100002 | N | Y | N | N | N | N | Y | N | N | N | N | 2 | 20 |
| 100003 | N | N | N | N | N | N | N | N | N | N | N | 0 | 0 |
| 100004 | Y | Y | Y | N | Y | Y | Y | Y | N | N | N | 6 | 60 |
| 100005 | N | N | Y | Y | Y | N | N | Y | N | N | N | 4 | 40 |
| 100006 | N | N | N | N | N | Y | N | N | Y | N | Y | 3 | 30 |
| 100007 | N | N | N | N | N | Y | N | N | N | Y | N | 2 | 20 |
| 100008 | N | Y | N | N | N | N | Y | N | N | N | N | 2 | 20 |
| 100009 | Y | N | Y | Y | N | Y | Y | Y | N | N | Y | 6 | 60 |
| 100010 | N | N | N | Y | N | N | Y | N | N | N | N | 3 | 30 |
| 100011 | N | N | N | N | N | Y | N | N | N | N | N | 1 | 10 |
| 100012 | N | N | Y | Y | Y | N | Y | N | N | N | Y | 5 | 50 |
| .. | .. | .. | .. | .. | .. | .. | .. | .. | .. | .. | .. | .. | .. |
| .. | .. | .. | .. | .. | .. | .. | .. | .. | .. | .. | .. | .. | .. |
| 100579 | N | N | Y | N | Y | N | N | N | N | N | N | 2 | 20 |
| 100580 | N | N | N | Y | Y | N | Y | N | N | Y | Y | 5 | 50 |

FIG. 17

| % YES | INSTANCE COUNT | ACTUAL Y | ACTUAL N | CUMULATIVE Y | CUMULATIVE N |
|---|---|---|---|---|---|
| 100 | 1 | 1 | 0 | 1 | 0 |
| 99 | 0 | 0 | 0 | 1 | 0 |
| 98 | 0 | 0 | 0 | 1 | 0 |
| 97 | 0 | 0 | 0 | 1 | 0 |
| 96 | 0 | 0 | 0 | 1 | 0 |
| 95 | 0 | 0 | 0 | 1 | 0 |
| 94 | 0 | 0 | 0 | 1 | 0 |
| 93 | 0 | 0 | 0 | 1 | 0 |
| 92 | 0 | 0 | 0 | 1 | 0 |
| 91 | 0 | 0 | 0 | 1 | 0 |
| 90 | 5 | 4 | 1 | 5 | 1 |
| 89 | 0 | 0 | 0 | 5 | 1 |
| 88 | 0 | 0 | 0 | 5 | 1 |
| 87 | 0 | 0 | 0 | 5 | 1 |
| 86 | 0 | 0 | 0 | 5 | 1 |
| 85 | 0 | 0 | 0 | 5 | 1 |
| 84 | 0 | 0 | 0 | 5 | 1 |
| 83 | 0 | 0 | 0 | 5 | 1 |
| 82 | 0 | 0 | 0 | 5 | 1 |
| 81 | 0 | 0 | 0 | 5 | 1 |
| 80 | 3 | 2 | 1 | 7 | 2 |
| 79 | 0 | 0 | 0 | 7 | 2 |
| 78 | 0 | 0 | 0 | 7 | 2 |
| 77 | 0 | 0 | 0 | 7 | 2 |
| 76 | 0 | 0 | 0 | 7 | 2 |
| 75 | 0 | 0 | 0 | 7 | 2 |
| 74 | 0 | 0 | 0 | 7 | 2 |
| 73 | 0 | 0 | 0 | 7 | 2 |
| 72 | 0 | 0 | 0 | 7 | 2 |
| 71 | 0 | 0 | 0 | 7 | 2 |
| 70 | 4 | 2 | 2 | 9 | 4 |
| 69 | 0 | 0 | 0 | 9 | 4 |
| 68 | 0 | 0 | 0 | 9 | 4 |
| 67 | 0 | 0 | 0 | 9 | 4 |
| 66 | 0 | 0 | 0 | 9 | 4 |
| 65 | 0 | 0 | 0 | 9 | 4 |

FIG. 18A

| % YES | INSTANCE COUNT | ACTUAL Y | ACTUAL N | CUMULATIVE Y | CUMULATIVE N |
|---|---|---|---|---|---|
| 64 | 0 | 0 | 0 | 9 | 4 |
| 63 | 0 | 0 | 0 | 9 | 4 |
| 62 | 0 | 0 | 0 | 9 | 4 |
| 61 | 0 | 0 | 0 | 9 | 4 |
| 60 | 4 | 2 | 2 | 11 | 6 |
| 59 | 0 | 0 | 0 | 11 | 6 |
| 58 | 0 | 0 | 0 | 11 | 6 |
| 57 | 0 | 0 | 0 | 11 | 6 |
| 56 | 0 | 0 | 0 | 11 | 6 |
| 55 | 0 | 0 | 0 | 11 | 6 |
| 54 | 0 | 0 | 0 | 11 | 6 |
| 53 | 0 | 0 | 0 | 11 | 6 |
| 52 | 0 | 0 | 0 | 11 | 6 |
| 51 | 0 | 0 | 0 | 11 | 6 |
| 50 | 13 | 1 | 12 | 12 | 18 |
| 49 | 0 | 0 | 0 | 12 | 18 |
| 48 | 0 | 0 | 0 | 12 | 18 |
| 47 | 0 | 0 | 0 | 12 | 18 |
| 46 | 0 | 0 | 0 | 12 | 18 |
| 45 | 0 | 0 | 0 | 12 | 18 |
| 44 | 0 | 0 | 0 | 12 | 18 |
| 43 | 0 | 0 | 0 | 12 | 18 |
| 42 | 0 | 0 | 0 | 12 | 18 |
| 41 | 0 | 0 | 0 | 12 | 18 |
| 40 | 15 | 5 | 10 | 17 | 28 |
| 39 | 0 | 0 | 0 | 17 | 28 |
| 38 | 0 | 0 | 0 | 17 | 28 |
| 37 | 0 | 0 | 0 | 17 | 28 |
| 36 | 0 | 0 | 0 | 17 | 28 |
| 35 | 0 | 0 | 0 | 17 | 28 |

| % YES | INSTANCE COUNT | ACTUAL Y | ACTUAL N | CUMULATIVE Y | CUMULATIVE N |
|---|---|---|---|---|---|
| 34 | 0 | 0 | 0 | 17 | 28 |
| 33 | 0 | 0 | 0 | 17 | 28 |
| 32 | 0 | 0 | 0 | 17 | 28 |
| 31 | 0 | 0 | 0 | 17 | 28 |
| 30 | 29 | 1 | 28 | 18 | 56 |
| 29 | 0 | 0 | 0 | 18 | 56 |
| 28 | 0 | 0 | 0 | 18 | 56 |
| 27 | 0 | 0 | 0 | 18 | 56 |
| 26 | 0 | 0 | 0 | 18 | 56 |
| 25 | 0 | 0 | 0 | 18 | 56 |
| 24 | 0 | 0 | 0 | 18 | 56 |
| 23 | 0 | 0 | 0 | 18 | 56 |
| 22 | 0 | 0 | 0 | 18 | 56 |
| 21 | 0 | 0 | 0 | 18 | 56 |
| 20 | 193 | 1 | 192 | 19 | 248 |
| 19 | 0 | 0 | 0 | 19 | 248 |
| 18 | 0 | 0 | 0 | 19 | 248 |
| 17 | 0 | 0 | 0 | 19 | 248 |
| 16 | 0 | 0 | 0 | 19 | 248 |
| 15 | 0 | 0 | 0 | 19 | 248 |
| 14 | 0 | 0 | 0 | 19 | 248 |
| 13 | 0 | 0 | 0 | 19 | 248 |
| 12 | 0 | 0 | 0 | 19 | 248 |
| 11 | 0 | 0 | 0 | 19 | 248 |
| 10 | 313 | 1 | 312 | 20 | 560 |
| 9 | 0 | 0 | 0 | 20 | 560 |
| 8 | 0 | 0 | 0 | 20 | 560 |
| 7 | 0 | 0 | 0 | 20 | 560 |
| 6 | 0 | 0 | 0 | 20 | 560 |
| 5 | 0 | 0 | 0 | 20 | 560 |
| 4 | 0 | 0 | 0 | 20 | 560 |
| 3 | 0 | 0 | 0 | 20 | 560 |
| 2 | 0 | 0 | 0 | 20 | 560 |
| 1 | 0 | 0 | 0 | 20 | 560 |
| 0 | 0 | 0 | 0 | 20 | 560 |

FIG. 18C

| ID | J48_M1 | J48_M2 | J48_M3 | J48_M4 | J48_M5 | J48_M6 | J48_M7 | J48_M8 | J48_M9 | J48_M10 | YES COUNT | J48_RESULT |
|---|---|---|---|---|---|---|---|---|---|---|---|---|
| 1 | Y | N | N | Y | N | N | N | Y | N | N | 3 | Y |
| 2 | N | N | N | N | Y | N | Y | N | N | N | 2 | N |
| 3 | Y | Y | Y | Y | N | Y | Y | N | Y | Y | 8 | Y |
| 4 | N | N | N | N | N | N | N | N | N | Y | 1 | N |
| 5 | Y | N | Y | N | Y | Y | Y | N | N | N | 5 | Y |
| 6 | Y | N | N | N | N | N | N | N | N | Y | 2 | N |
| 7 | N | Y | N | N | N | N | N | Y | N | N | 2 | N |
| 8 | N | N | N | N | N | N | N | N | N | N | 0 | N |
| 9 | N | N | N | N | N | N | N | Y | N | N | 1 | N |
| 10 | N | N | Y | N | Y | N | N | N | N | N | 2 | N |
| 11 | N | Y | N | N | N | N | N | N | N | N | 1 | N |
| 12 | Y | N | Y | Y | Y | Y | N | Y | N | Y | 7 | Y |
| 13 | Y | N | N | Y | N | N | Y | N | N | Y | 4 | Y |
| 14 | N | N | N | N | N | N | N | N | N | N | 0 | N |
| 15 | N | N | Y | N | N | N | N | N | N | N | 1 | N |

FIG. 20

| ID | J48_RESULT | NAIVE BAYES_RESULT | k-NEAREST NEIGHBORS_RESULT | RANDOM FOREST_RESULT | SUPPORT VECTOR MACHINE MODEL_RESULT | Y VOTE | FINAL DECISION |
|---|---|---|---|---|---|---|---|
| 1 | Y | Y | Y | Y | Y | 5 | Y |
| 2 | N | N | Y | N | N | 1 | N |
| 3 | Y | N | N | N | N | 1 | N |
| 4 | N | Y | Y | N | N | 2 | N |
| 5 | Y | Y | N | Y | Y | 4 | Y |
| 6 | N | Y | N | Y | N | 2 | N |
| 7 | N | Y | N | Y | Y | 3 | Y |
| 8 | N | N | Y | N | N | 1 | N |
| 9 | N | Y | N | Y | Y | 3 | Y |
| 10 | N | N | N | N | N | 0 | N |
| 11 | N | Y | N | N | N | 1 | N |
| 12 | Y | N | N | N | N | 1 | N |
| 13 | Y | Y | Y | Y | Y | 5 | Y |
| 14 | N | Y | N | N | N | 1 | N |
| 15 | N | N | N | N | N | 0 | N |

FIG. 21

PRIMARY KEY-FOREIGN KEY RELATIONSHIP DETERMINATION THROUGH MACHINE LEARNING

BACKGROUND

For performing data integration in large enterprises, database structure and semantic relations between schema elements of a database have to be known and understood. Due to legacy data management in large enterprises, the semantic relations between schema elements, for example, columns of tables in a database are often lost or corrupted. Determining the semantic relations between the schema elements is a time consuming and costly process. When an explicit semantic relation is not available, it becomes time consuming to identify the semantic relation due to the vast size of the database and nature of data stored in the tables.

A significant class of semantic relations between schema elements is primary key-foreign key relationships. A primary key is a column in a table that uniquely identifies each record in the table. A foreign key is an attribute or a column in another table that maps to the primary key to form a relationship between the tables. The relationship between the primary key and the foreign key is referred to as a "primary key-foreign key relationship". The primary key-foreign key relationship helps in fetching records queried by a user of the database quickly without having to access numerous tables in an enterprise, thereby saving time and effort. The primary key-foreign key relationship allows determination of a data flow in a schema whenever any form of perturbation, insertion, or deletion occurs to any record in the database. However, determining primary key-foreign key relationships in databases of large enterprises is a time intensive, processor intensive, and computation intensive process. Consider an example where a primary key-foreign key relationship between 100 tables with 20 columns each has to be found. Around four million pairs of columns have to be explored to find a possible primary key-foreign key relationship. A brute force method cannot be used to find a possible primary key-foreign key relationship among four million pairs of columns. For a primary key-foreign key relationship to exist between the schema elements, a precondition of inclusion dependency needs to be satisfied. Inclusion dependency is a property of data which, when satisfied, requires every value of one column of a table to exist as a value of another column in a different or the same table. On determining inclusion dependency between the schema elements, the number of pairs of schema elements to be evaluated for primary key-foreign key relationships is significantly reduced, but is still significantly large for a manual determination of primary key-foreign key relationships. Therefore, there is a need for automating the process for determining primary key-foreign key relationships between the schema elements using computation intensive processors.

There are a few conventional methods for determining primary key-foreign key relationships. In one conventional method, metadata from the pairs of columns in tables is used to determine primary key-foreign key relationships. A single feature, for example, a column name is used to determine the primary key-foreign key relationships in this method. With the single feature, that is, the column name, the determination of the primary key-foreign key relationship may not be as accurate as the primary key identified may have repeated values and may not satisfy the property of a primary key. There is a need for a method for determining primary key-foreign key relationships between data in tables by using an intelligent combination of features of the data in the tables and by not relying on a single feature.

In another conventional method for determining primary key-foreign key relationships between data in tables, a pruning criterion and a ranking function are employed. The pruning criterion eliminates pairs of columns in the tables that are unlikely to have a primary key-foreign key relationship. The ranking function ranks the pairs of columns in the tables that satisfy the pruning criterion. The pruning criterion and the ranking function are limited by definition by a programmer. In other conventional methods, primary key-foreign key relationships are found using rule based approaches. One of the rule based approaches is to determine a cumulative probability distribution of the primary key and the foreign key in the pairs of columns in the tables and compute a score for each of the pairs of columns. However, the scope of determination of primary key-foreign key relationships using the rule based approaches is limited by the rules defined for the determination, which is typically not accurate. The rule based approaches also needs a human expert or a programmer to define the rules and execute an algorithm. The computation of a score is a processor intensive and time consuming process. There is a need for a method for determining primary key-foreign key relationships between data based on past observations more accurately while consuming less time. The machine learning based approach is one such approach for determining primary key-foreign key relationships accurately. The machine learning based approach learns inherent property of primary key-foreign key relationships from already classified data and hence is a robust approach fordetermining primary key-foreign key relationships.

In the machine learning approach, a machine learning classification algorithm learns from patterns of already classified data. The already classified data acts as training data for training the machine learning classification algorithm. If the machine learning classification algorithm is applied for a classification problem, the machine learning classification algorithm is trained on the already classified data that is classified into two categories: positive training data comprising primary key-foreign key pairs and negative training data comprising non-primary key-foreign key pairs. If the machine learning classification algorithm is trained on predominantly negative training data, a trained machine learning model generated from application of the machine learning classification algorithm will be biased towards the negative training data. When subjected to actual data whose primary key-foreign key relationship is to be determined, the trained machine learning model classifies the actual data spuriously. Furthermore, using a single machine learning classification algorithm for determining a primary key-foreign key relationship between schema elements may result in a spurious classification. A combination of multiple machine learning classification algorithms will result in a better determination of the primary key-foreign key relationship between the actual data.

Hence, there is a long felt need for a method and a system that determine primary key-foreign key relationships among schema elements, that is, data in multiple tables through machine learning using computation intensive processors. Moreover, there is a need for a method and a system that intelligently combine the features of data in a table for determining the primary key-foreign key relationship between the actual schema elements. Furthermore, there is a need for a method and a system that split the training data in a manner to avoid skewing of the training data towards negative training data to avoid an erroneous classification of the schema elements by a machine learning classification algorithm. Furthermore, there is a need for a method and a system that intelligently combines multiple machine learning classification algorithms for determining the primary key-foreign key relationship between the actual schema elements.

SUMMARY

This summary is provided to introduce a selection of concepts in a simplified form that are further disclosed in the detailed description of the invention. This summary is not intended to determine the scope of the claimed subject matter.

The method and the system disclosed herein address the above mentioned need for determining primary key-foreign key relationships among schema elements, that is, data in multiple tables through machine learning using computation intensive processors. Moreover, the method and the system disclosed herein intelligently combine features of the data in each table for determining the primary key-foreign key relationship between actual schema elements. Furthermore, the method and the system disclosed herein split training data that trains machine learning classification algorithms in a manner to avoid skewing of the training data towards negative training data to avoid an erroneous classification of the schema elements by the machine learning classification algorithms. Furthermore, the method and the system disclosed herein intelligently combine multiple machine learning classification algorithms for determining the primary key-foreign key relationship between the actual schema elements.

The method disclosed herein employs a machine learning relationship determination system (MLRDS) comprising at least one processor configured to execute computer program instructions for determining primary key-foreign key relationships among data in multiple tables of a target database through machine learning. The MLRDS selects a first column of data from a first table among the tables and a second column of data from a second table among the tables for each of the tables in the target database. The first column of data comprises a first column name. The second column of data comprises a second column name different from the first column name. The MLRDS identifies the selected first column of data as a prospective primary key and the selected second column of data as a prospective foreign key to form an inclusion dependency pair on determining presence of data elements of the selected second column of data in the selected first column of data in their entirety. The MLRDS receives multiple predetermined inclusion dependency pairs comprising primary key-foreign key pairs classified as positive training data and positive validation data, and non-primary key-foreign key pairs classified as negative training data and negative validation data, from a source database. The positive validation data and the negative validation data form a validation data set. The MLRDS splits the positive training data and the negative training data into training data sets. The MLRDS computes multiple primary key-foreign key features for the inclusion dependency pair of the prospective primary key and the prospective foreign key, the training data sets, and the validation data set. The MLRDS generates trained machine learning models corresponding to the training data sets by training each machine learning classification algorithm using the training data sets and the computed primary key-foreign key features of the training data sets.

The machine learning relationship determination system (MLRDS) generates validated machine learning models for each of the machine learning classification algorithms on testing the generated trained machine learning models corresponding to the training data sets with the validation data set using the computed primary key-foreign key features of the validation data set. The MLRDS determines an optimum algorithm decision threshold for each of the machine learning classification algorithms using the generated validated machine learning models. The MLRDS then determines a resultant of the inclusion dependency pair being a primary key-foreign key pair or a non-primary key-foreign key pair for each of the machine learning classification algorithms using the determined optimum algorithm decision threshold and the computed primary key-foreign key features of the inclusion dependency pair of the prospective primary key and the prospective foreign key. The MLRDS performs majority voting on the determined resultant for each of the machine learning classification algorithms to determine a primary key-foreign key relationship among the data in the selected first column of data of the first table and the selected second column of data of the second table.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 5 exemplarily illustrates a table containing test outputs of the trained machine learning models obtained by the machine learning relationship determination system on testing the trained machine learning models against a validation data set.

FIG. 6 exemplarily illustrates a table containing a number of instances of the validation data set that defines a primary key-foreign relationship between the instances of the validation data set for determining an optimum algorithm decision threshold using validated machine learning models.

FIG. 7 exemplarily illustrates a table containing a cumulative number of instances of the validation data set that defines a primary key-foreign relationship between the instances of the validation data set for determining an optimum algorithm decision threshold using the validated machine learning models.

FIGS. 10A-10B exemplarily illustrate two tables of a target database with respective columns whose primary key-foreign key relationship is to be determined.

FIG. 11 exemplarily illustrates a table from a source database containing training data.

FIG. 12 exemplarily illustrates a table from the source database containing a validation data set.

FIGS. 14A-14B exemplarily illustrate a table containing the training data with primary key-foreign key features computed for the training data by the machine learning relationship determination system.

FIGS. 15A-15B exemplarily illustrate a table containing the validation data set with primary key-foreign key features computed for the validation data set by the machine learning relationship determination system.

FIG. 17 exemplarily illustrates a table containing outputs of the trained machine learning models obtained by the machine learning relationship determination system on validating the trained machine learning models against the validation data set.

FIGS. 18A-18C exemplarily illustrate a table containing a cumulative number of instances of the validation data set that defines a primary key-foreign relationship between the instances of the validation data set for determining an optimum algorithm decision threshold using the validated machine learning models.

FIG. 20 exemplarily illustrates a table showing resultants of the inclusion dependency pairs identified from the tables shown in FIGS. 10A-10B, being primary key-foreign key pairs or non-primary key-foreign key pairs, generated by the machine learning relationship determination system using the optimum algorithm decision threshold.

FIG. 21 exemplarily illustrates a table containing final resultants of the inclusion dependency pairs identified from the tables shown in FIGS. 10A-10B, being primary key-foreign key pairs or non-primary key-foreign key pairs, generated by the machine learning relationship determination system on performing majority voting on the resultants shown in FIG. 20.

DETAILED DESCRIPTION

Figure 1A:
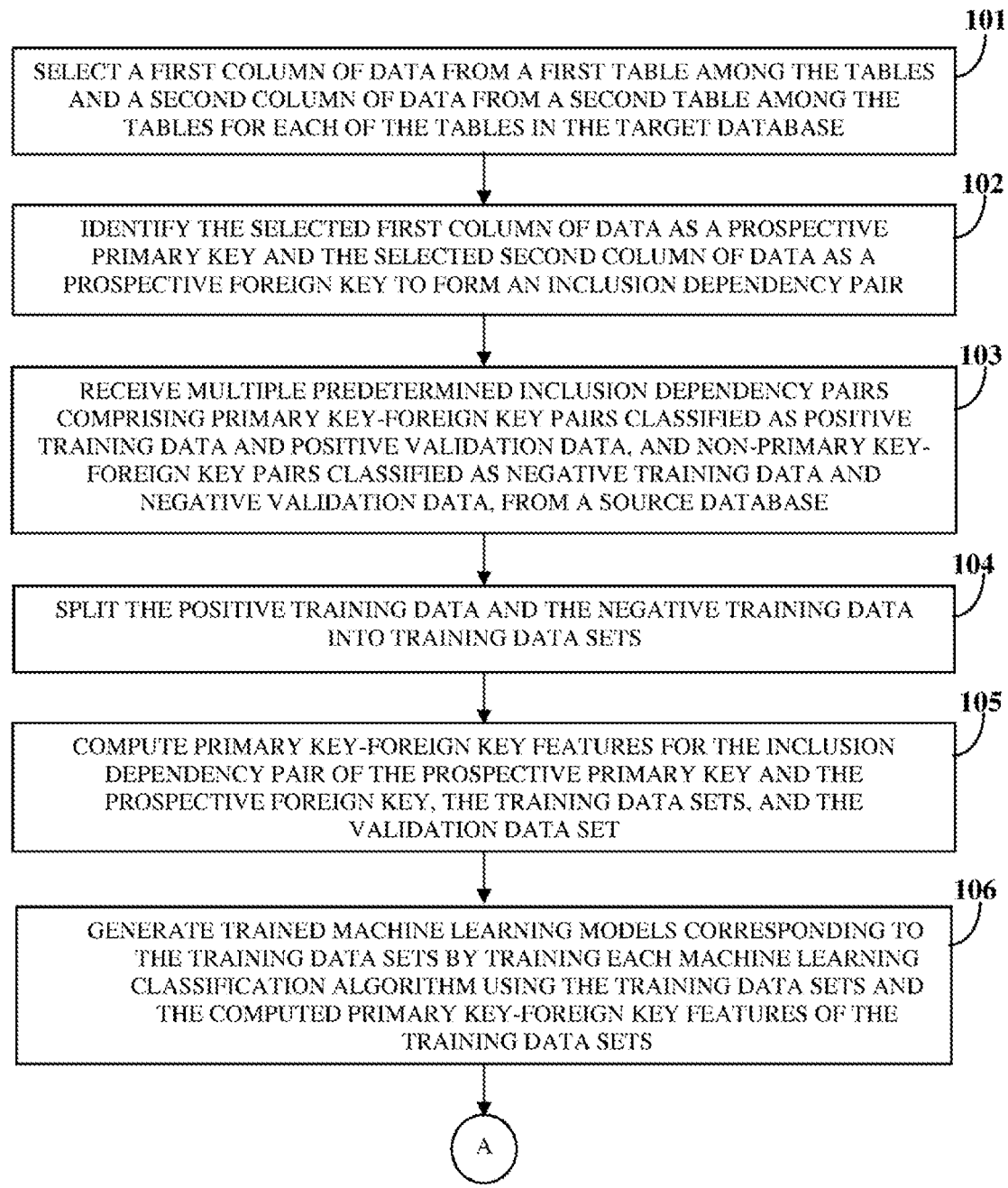
FIGS. 1A-1B illustrate a method for determining primary key-foreign key relationships among data in multiple tables of a target database through machine learning.
Figure 1B:
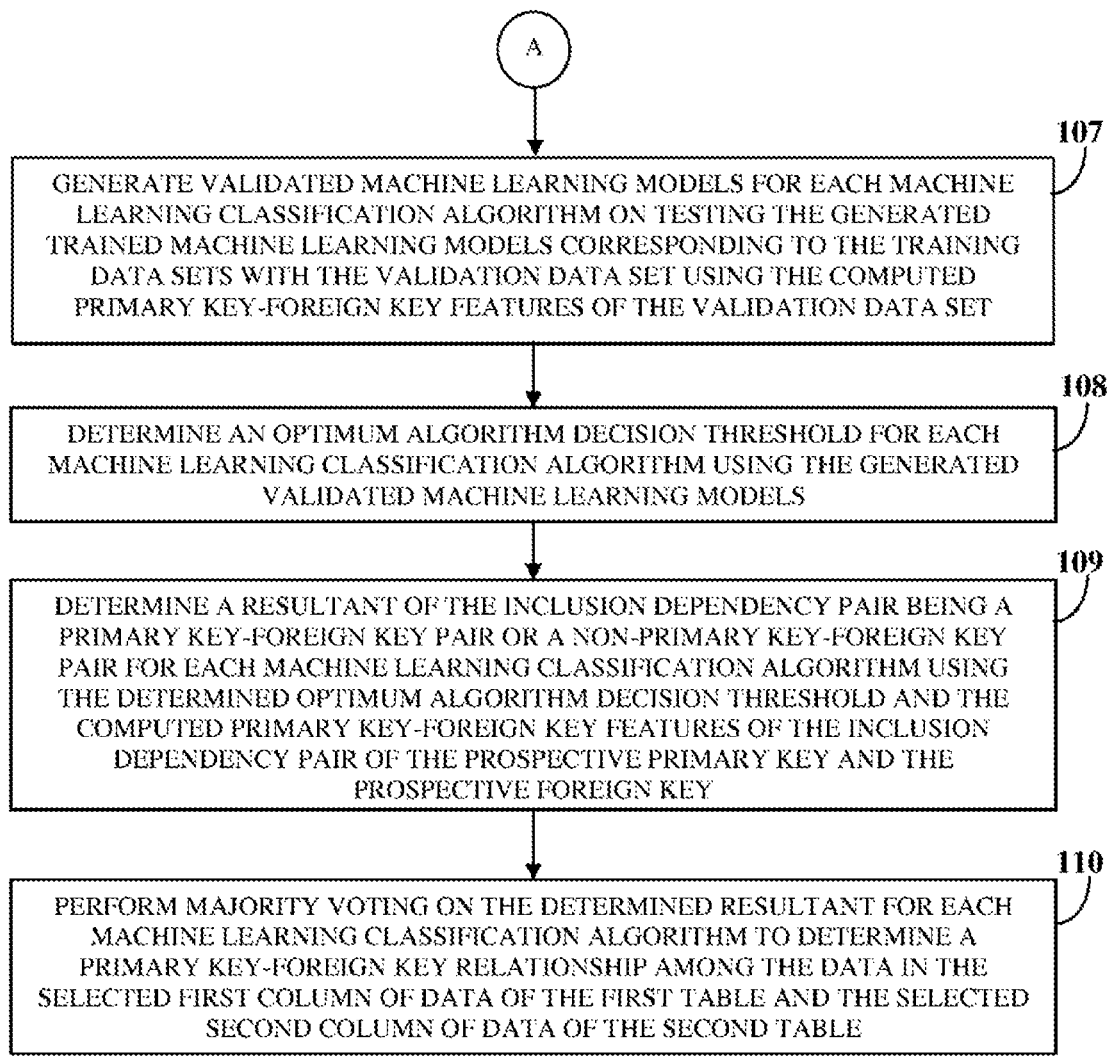

FIGS. 1A-1B illustrate a method for determining primary key-foreign key relationships among data in multiple tables of a target database through machine learning. As used herein, a "target database" refers to a database that is targeted for determining primary key-foreign key relationships among a collection of data that is organized in multiple tables for access, management, and updating of the data. Each table of the target database comprises multiple rows and columns. In the target database, primary key-foreign key relationships between data in the columns of the tables are to be determined. As used herein, a "primary key-foreign key relationship" refers to a relationship between a primary key in a table and a foreign key in another table. The primary key in a table is a column in the table that uniquely identifies a row of the table. The table with the primary key is identified as a parent table. A foreign key is a column in another table, typically referred to as a child table, that maps to the primary key in the parent table to control the data to be stored in the child table. When a foreign key references or maps to a primary key, a link is created between the parent table and the child table, which defines the primary key-foreign key relationship between columns in the parent table and the child table. Machine learning refers to a type of artificial intelligence that provides processors with an ability to learn from and make predictions on data without being explicitly programmed. Machine learning focuses on the development of computer programs that can teach themselves to grow and change when exposed to new data. An algorithm for machine learning is referred to as a "machine learning algorithm". A machine learning algorithm searches for a pattern in data used for training the machine learning algorithm and uses the pattern to detect patterns in new data and adjust program actions accordingly. The data used for training the machine learning algorithm is referred to as "training data". Machine learning algorithms are categorized as being supervised or unsupervised. Supervised machine learning algorithms infer from the training data and apply learning to new data. Unsupervised machine learning algorithms draw inferences from the training data.

The method disclosed herein employs a machine learning relationship determination system (MLRDS) comprising at least one processor configured to execute computer program instructions for determining primary key-foreign key relationships among data in multiple tables in a target database through machine learning. In an embodiment, the MLRDS is a computer system comprising at least one processor configured to execute computer program instructions for determining primary key-foreign key relationships among data in multiple tables in a target database through machine learning. In another embodiment, the MLRDS comprises a software application downloadable and usable on a user device. In another embodiment, the MLRDS is implemented as a web based platform, for example, a website hosted on a server or a network of servers accessible by a user device via a network, for example, the internet, a wireless network, a mobile telecommunication network, etc. In another embodiment, the MLRDS is implemented in a cloud computing environment and provides an open communication community service. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. In another embodiment, the MLRDS is configured as a cloud computing based platform implemented as a service for determining primary key-foreign key relationships among data in multiple tables in a target database through machine learning.

The machine learning relationship determination system (MLRDS) selects 101 a first column of data from a first table among the multiple tables of the target database and a second column of data from a second table among the multiple tables of the target database for each of the multiple tables in the target database. As used herein, the "first table" refers to a prospective parent table with a prospective primary key and the "second table" refers to a prospective child table with a prospective foreign key. The MLRDS selects the first table and the second table from the multiple tables in the target database. Also, as used herein, the "first column" refers to a column of the prospective parent table and the "second column" refers to a column of the prospective child table. The first column of data comprises a first column name. The first column name forms metadata of the first column. The second column of data comprises a second column name. The second column name forms metadata of the second column and is different from the first column name. The MLRDS selects pairs of columns from different tables in the target database iteratively to determine primary key-foreign key relationships among data in the column pairs. Consider an example where the target database contains 5 tables with 100 columns each. The total number of columns in this target database is 500. The MLRDS selects a pair of columns from these 500 columns. The number of column pairs that can be selected from the 500 columns is $^{500}P_2=500*499-250000$. The MLRDS selects the possible number of about 250000 column pairs from the 5 tables in the target database to determine primary key-foreign key relationships between the 500 columns.

The machine learning relationship determination system (MLRDS) identifies 102 the selected first column of data as a prospective primary key and the selected second column of data as a prospective foreign key to form an inclusion dependency pair on determining presence of data elements of the selected second column of data in the selected first column of data in their entirety. As used herein, "inclusion dependency pair" refers to a pair of the selected first column and the selected second column where the data elements in the selected second column are a subset of the data elements in the selected first column. That is, all the data elements in the selected second column are present in the selected first column. Also, as used herein, "data elements" refers to data or values in the columns in the tables of the target database. The MLRDS determines the presence of all the data elements of the second column in the first column and identifies the first column and the second column to form an inclusion dependency pair. To identify inclusion dependency between the first column and the second column, the MLRDS sorts both the columns and for each data element in the second column, the MLRDS searches if that data element is present in the first column.

For a primary key-foreign key relationship to exist between the first column and the second column, a necessary condition is that the first column and the second column form an inclusion dependency pair. Merely determining that the first column and the second column form an inclusion dependency pair is insufficient for determining a primary key-foreign key relationship. While all primary key-foreign key relationships possess inclusion dependency, not all inclusion dependency pairs are primary key-foreign key pairs. On satisfying the condition for forming an inclusion dependency pair, the machine learning relationship determination system (MLRDS) identifies the selected first column as a prospective primary key and the selected second column as a prospective foreign key. Identifying inclusion dependency pairs of columns in the target database results in a significant reduction in the number of possible column pairs of columns in the multiple tables of the target database to be evaluated for determining the primary key-foreign key relationships among the multiple tables in the target database. Multiple preconditions, for example, same data type, NULL value, etc., are to be met by the column pairs to hold primary key-foreign key relationships. The precondition of the same data type is satisfied by the column pairs when data elements of the column pairs are of the same data type. The precondition of NULL value is satisfied when the column identified as a primary key or a foreign key does not contain a NULL value. The MLRDS eliminates the column pairs that do not satisfy the predetermined conditions. In this manner, the MLRDS eliminates a significant number of spurious pairs. Consider an example of a pair of columns, namely, EMP_ID that uniquely identifies an employee of an organization and DEP_KEY that uniquely identifies a department of the organization. Also, consider the data type of the data elements in the column EMP_ID is integer. For the column pair EMP_ID and DEP_KEY to hold a primary key-foreign key relationship, the data type of the data elements in the column DEP_KEY must be integer. If the data type of the data elements in the column DEP_KEY is not integer, the MLRDS eliminates the column pair EMP_ID and DEP_KEY as a spurious pair that cannot hold a primary key-foreign key relationship. If the data type of the data elements in the column DEP_KEY is an integer, the MLRDS evaluates the EMP_ID and DEP_KEY column pair for inclusion dependency. The column pairs that satisfy the condition for inclusion dependency are subjected to machine learning, and the remaining column pairs that do not satisfy the condition for inclusion dependency are eliminated.

The machine learning relationship determination system (MLRDS) receives 103 multiple predetermined inclusion dependency pairs comprising primary key-foreign key pairs and non-primary key-foreign key pairs from a source database. As used herein, "predetermined inclusion dependency pairs" refers to pairs of columns in the tables of a source database that are found to be inclusion dependency pairs. Also, as used herein, "primary key-foreign key pairs" refers to the inclusion dependency pairs that are confirmed to possess primary key-foreign key relationships. Also, as used herein, "non-primary key-foreign key pairs" refers to the inclusion dependency pairs that are confirmed not to have primary key-foreign key relationships, that is, the column pairs are not related by a primary key and a foreign key. Also, as used herein, a "source database" refers to an external database with tables separate from the target database. In the source database, the primary key-foreign key pairs and the non-primary key-foreign key pairs of the columns in the tables are already identified. Thus, the source database acts as a source for the predetermined inclusion dependency pairs comprising the primary key-foreign key pairs and the non-primary key-foreign key pairs. In the source database, the metadata of the columns in the tables is available and aids in identifying the primary key-foreign key relationships.

The primary key-foreign key pairs are classified into positive training data and positive validation data. The non-primary key-foreign key pairs are classified into negative training data and negative validation data. As used herein, "training data" refers to labeled data comprising pairs of input values and predetermined output values for training a machine learning classification algorithm. As used herein, "machine learning classification algorithm" refers to a machine learning algorithm that classifies columns in the tables of the target database into primary key-foreign key pairs and non-primary key-foreign key pairs. The machine learning classification algorithm learns from already classified data and applies its learning to unclassified inclusion dependency pairs. The training data used by the machine learning relationship determination system (MLRDS) comprises the predetermined inclusion dependency pairs of columns of the tables in the source database comprising predetermined primary key-foreign key pairs and predetermined non-primary key-foreign key pairs. The input values of the training data comprise, for example, the column names or the data in the predetermined inclusion dependency pairs of columns of the tables in the source database. The predetermined output values of the training data comprise, for example, primary key-foreign key flags indicating whether the predetermined inclusion dependency pairs hold a primary key-foreign key relationship or not. For example, if a predetermined inclusion dependency pair is a primary key-foreign key pair, the primary key-foreign key flag is "Y", and if the predetermined inclusion dependency pair is a non-primary key-foreign key pair, the primary key-foreign key flag is "N". "Y" indicates YES that denotes that the predetermined inclusion dependency pair is a primary key-foreign key pair, and "N" indicates NO that denotes that the predetermined inclusion dependency pair is a non-primary key-foreign key pair. The primary key-foreign key pairs from the predetermined inclusion dependency pairs form the "positive training data" and the non-primary key-foreign key pairs form the "negative training data" used by the MLRDS to train the machine learning classification algorithm. The positive training data comprises, for example, input values as column names of the pairs of columns in the source database that are primary key-foreign key pairs and the primary key-foreign key flag "Y" as the predetermined output value. The negative training data comprises, for example, input values as column names of the pairs of columns in the source database that are non-primary key-foreign key pairs and the primary key-foreign key flag "N" as the predetermined output value.

Also, as used herein, "validation data" refers to labeled data comprising pairs of input values and predetermined output values for testing a machine learning classification algorithm that is trained on the training data. The validation data used by the machine learning relationship determination system (MLRDS) comprises predetermined inclusion dependency pairs of columns of the tables in the source database comprising predetermined primary key-foreign key pairs and predetermined non-primary key-foreign key pairs. The input values of the validation data comprise, for example, the column names or the data in the predetermined inclusion dependency pairs of columns of the tables in the source database. The predetermined output values of the validation data comprise, for example, primary key-foreign key flags indicating whether the predetermined inclusion dependency pairs hold a primary key-foreign key relationship or not. For example, the primary key-foreign key pairs constitute the positive validation data and are indicated with a "Y" as the primary key-foreign key flag, and the non-primary key-foreign key pairs constitute the negative validation data and are indicated with an "N" as the primary key-foreign key flag. The MLRDS receives the predetermined inclusion dependency pairs pre-classified into positive training data, negative training data, positive validation data, and negative validation data from the source database. The positive validation data and the negative validation data form a validation data set. In an embodiment, the MLRDS receives only positive training data and negative training data. In this embodiment, the MLRDS uses a predetermined percentage of the received positive training data for training the machine learning classification algorithm, and the remaining percentage of the received positive training data as the positive validation data for validating the trained machine learning classification algorithm. Similarly, the MLRDS uses a predetermined percentage of the received negative training data for training the machine learning classification algorithm, and the remaining percentage of the received negative validation data for validating the trained machine learning classification algorithm. For example, if the MLRDS receives 100 samples of positive training data and 100 samples of negative training data, the MLRDS uses 30 samples of the positive training data as positive validation data, and 30 samples of the negative training data as negative validation data. The remaining 70 samples of the positive training data and the remaining 70 samples of the negative training data constitute the training data used by the MLRDS for training the machine learning classification algorithm.

The machine learning relationship determination system (MLRDS) uses the positive training data and the negative training data to train each of a combination of machine learning classification algorithms to determine primary key-foreign key relationships between data in the target database. The MLRDS uses the positive validation data and the negative validation data to test and validate the trained machine learning classification algorithm. The MLRDS then determines the primary key-foreign key relationship of the inclusion dependency pair to be a primary key-foreign key pair, or a non-primary key-foreign key pair using the validated machine learning classification algorithm. The machine learning relationship determination system (MLRDS) uses a combination of machine learning classification algorithms, for example, the J48 algorithm, the k-Nearest Neighbors algorithm, the Naive Bayes algorithm, the Random Forest algorithm, Bayes network model, a multilayer perceptron model, a support vector machine model, etc., for identifying primary key-foreign key pairs and non-primary key-foreign key pairs from the columns in the tables of the target database. A single machine learning classification algorithm may result in an output with a possible bias towards, for example, non-primary key-foreign key pairs because of training of the single machine learning classification algorithm using the non-primary key-foreign key pairs in the training data sets. On using the combination of machine learning classification algorithms, the MLRDS eliminates the bias in the outputs of a single machine learning classification algorithm as outputs of multiple machine learning classification algorithms are used by the MLRDS to determine an unbiased resultant. The MLRDS performs majority voting of the outputs of the multiple machine learning classification algorithms to obtain an unbiasedresultant.

The machine learning relationship determination system (MLRDS) splits 104 the positive training data and the negative training data into training data sets. As used herein, "training data sets" refers to sets of the training data for training a machine learning classification algorithm. Only a fraction of the training data is positive, that is, only a fraction of the training data comprises primary key-foreign key pairs and the remaining training data comprises non-primary key-foreign key pairs. If the machine learning classification algorithm is trained using a majority of the negative training data, the machine learning classification algorithm will be biased towards the non-primary key-foreign key pairs and will result in a false classification of the prospective primary key-prospective foreign key pairs. Therefore, the MLRDS splits the training data into multiple training data sets to reduce a skew of the MLRDS towards a false determination of primary key-foreign key relationships in the identified inclusion dependency pairs. The MLRDS splits the negative training data into multiple training data sets and adds the positive training data to each training data set. Consider an example where the MLRDS receives 1000 non-primary key-foreign key pairs as negative training data and 20 primary key-foreign key pairs as positive training data. To split the negative training data and the positive training data into training data sets, the MLRDS determines a configurable ratio of 1:5 of the positive training data and the negative training data in each training data set. The MLRDS then splits the negative training data into 10 training data sets with 100 non-primary key-foreign key pairs and adds 20 primary key-foreign key pairs to each training data set. The MLRDS then trains the machine learning classification algorithm with 10 training data sets, each with 20 primary key-foreign key pairs and 100 non-primary key-foreign key pairs.

The machine learning relationship determination system (MLRDS) computes 105 multiple primary key-foreign key features for the inclusion dependency pair of the prospective primary key and the prospective foreign key, the training data sets, and the validation data set. As used herein, "primary key-foreign key features" refer to characteristics of an inclusion dependency pair that enable the MLRDS to provide an indication on whether the inclusion dependency pair is a primary key-foreign key pair or a non-primary key-foreign key pair. The selection of the primary key-foreign key features has an influence on the performance of the machine learning classification algorithm. The MLRDS computes the primary key-foreign key features, for example, based on coverage since almost all primary keys are covered by foreign keys, names of the columns being similar, name patterns such as column names containing "_ID", statistical distribution of the primary key and foreign key being the same, etc. The MLRDS computes the primary key-foreign key features comprising, for example, a normalized rank sum, a unique foreign key ratio, a unique foreign share, a name similarity index, a name pattern acceptance, a distribution displacement, and an element count ratio, for determining whether an inclusion dependency pair is a primary key-foreign key pair or a non-primary key-foreign key pair. To compute the primary key-foreign key features, the MLRDS uses combinations of items identified from the tables of the source database and the target database. The MLRDS computes the primary key-foreign key features for the inclusion dependency pair of the prospective primary key and the prospective foreign key using one of multiple items comprising, for example, data elements of the prospective primary key identified by the selected first column of data, the data elements of the prospective foreign key identified by the selected second column of data, a number of unique data elements of the prospective foreign key, Levenshtein distance between names of the prospective primary key and the prospective foreign key, a prefix matching score obtained from the names of the prospective primary key and the prospective foreign key, sound codes obtained by applying a Metaphone algorithm on the names of the prospective primary key and the prospective foreign key, patterns of the names of the prospective primary key and the prospective foreign key, statistical measures, and any combination thereof, from the target database. The Levenshtein distance is a string metric for measuring the difference between two strings. The Metaphone algorithm is a phonetic algorithm that indexes words by their English-pronunciation.

The machine learning relationship determination system (MLRDS) further computes the primary key-foreign key features for the training data sets and the validation data set using one of multiple items comprising, for example, data elements of the predetermined inclusion dependency pairs, a number of unique data elements of foreign keys in the predetermined inclusion dependency pairs, Levenshtein distance between names of primary keys and the foreign keys in the predetermined inclusion dependency pairs, a prefix matching score obtained from the names of the primary keys and the foreign keys in the predetermined inclusion dependency pairs, sound codes obtained by applying a Metaphone algorithm on the names of the primary keys and the foreign keys in the predetermined inclusion dependency pairs, patterns such as suffixes of the names of the primary keys and the foreign keys in the predetermined inclusion dependency pairs, statistical measures, and any combination thereof, from the source database.

Consider an example of an inclusion dependency pair (F, P), where F is a prospective foreign key and P is a prospective primary key referenced by the prospective foreign key F. The machine learning relationship determination system (MLRDS) computes the primary key-foreign key feature, namely, normalized rank sum of two columns represented by the prospective foreign key F and the prospective primary key P by arranging the data elements in F and P in ascending order and inserting all the elements of F in P. In this example, the data elements of P are represented as {AB, CD, EF, GH, IJ, KL} and the data elements of F are represented as {AB, EF, IJ}. On inserting all the data elements of F in P, P union F (PU F) is represented as {AB, AB, CD, EF, EF, GH, IJ, IJ, KL}. The MLRDS computes a rank for each data element in PU F as follows: The rank for AB is (1+2)/2=1.5. Similarly, the ranks for CD, EF, GH, IJ, and KL are 3, 4.5, 6, 7.5, and 9 respectively. The MLRDS computes the normalized rank sum as a total sum of ranks divided by a product of the total number of data elements and the number of data elements in the prospective foreign key F. That is, the MLRDS computes the normalized rank sum as 31.5/6*3=1.75. The MLRDS computes the primary key-foreign key feature, namely, the unique foreign key ratio as a ratio of the number of unique data elements in the prospective foreign key F and the total data elements in the prospective foreign key F. The MLRDS computes the primary key-foreign key feature, namely, the unique foreign share as the total number of unique data elements in the prospective foreign key F divided by the number of data elements in the prospective primary key P.

The machine learning relationship determination system (MLRDS) computes the primary key-foreign key feature, namely, the name similarity index using the Levenshtein distance between the names of the prospective primary key P and the prospective foreign key F, a prefix matching score obtained from the names of the prospective primary key and the prospective foreign key, and a sound code score obtained from the names of prospective primary key P and the prospective foreign key F. Consider an example where the names of the prospective primary key P and the prospective foreign key F are given as Np and Nf respectively. The Levenshtein distance between Np and Nf is denoted as Ld. The Levenshtein distance measures the similarity between the two names, for example, Np and Nf. The Levenshtein distance between the two names, Np and Nf, is the minimum number of single character edits, that is, insertions, deletions, or substitutions required to change one name Np into the other name Nf. The MLRDS computes the prefix matching score Pr as number of initial matching characters in Np and Nf divided by length of the longer name between Np and Nf. The MLRDS computes a sound code by applying the Metaphone algorithm on the name strings Np and Nf. The sound codes of Np and Nf are denoted as Sp and Sf respectively. The sound code score Sc is a prefix score of Sp and Sf and is given as a prefix score (Sp, Sf), that is, the number of matching characters in prefixes of Sp and Sf divided by length of the longer sound code between Sp and Sf. The MLRDS computes the Levenshtein distance Ld and computes a Levenshtein distance score Ls between Sp and Sf as Ls=1−(Ld) divided by length of the longer name between Np and Nf. The MLRDS then computes the name similarity index as a maximum of Ls, Pr, and Sc.

The machine learning relationship determination system (MLRDS) computes the primary key-foreign key feature, namely, the name pattern acceptance of the prospective primary key P and the prospective foreign key F by checking whether the name of the prospective primary key P or the name of the prospective foreign key F ends with a predetermined pattern, for example, "KEY" or "ID". If Np or Nf ends with "KEY" or "ID", the MLRDS assigns the name pattern acceptance value as 1. If Np or Nf does not end with "KEY" or "ID", the MLRDS assigns the name pattern acceptance value as 0. The MLRDS computes the primary key-foreign key feature, namely, distribution displacement of the inclusion dependency pair of P and F by calculating an earth mover's distance between P and F. The earth mover's distance is a measure of the distance between probability distributions of P and F over a region D. The MLRDS also computes the primary key-foreign key feature, namely, the element count ratio of P and F as a ratio of the number of data elements in F and the number of data elements in P. A generic computer using a generic program cannot compute the primary key-foreign key features for the inclusion dependency pair of the prospective primary key and the prospective foreign key, the training data sets, and the validation data set in accordance with the method steps disclosed above. The computed primary key-foreign key features do not decide deterministically whether or not the given inclusion dependency pair is a primary key-foreign key pair. The MLRDS presents the computed primary key-foreign key features to the machine learning classification algorithm to generate a machine learning model that determines whether or not the given inclusion dependency pair is a primary key-foreign key pair.

The machine learning relationship determination system (MLRDS) generates 106 trained machine learning models corresponding to the training data sets by training each machine learning classification algorithm using the training data sets and the computed primary key-foreign key features of the training data sets. As used herein, "trained machine learning models" refer to models generated by the machine learning classification algorithms trained on the training data sets using the computed primary key-foreign key features. For each machine learning classification algorithm, the MLRDS generates a trained machine learning model corresponding to each training data set using the computed primary key-foreign key features of the training data set. The trained machine learning models are obtained when the machine learning classification algorithm is trained on the computed primary key-foreign key features of the training data sets and the corresponding predetermined output values, that is, the corresponding primary key-foreign key flags of the training data set. Consider an example where the MLRDS splits the training data into 20 training data sets. The MLRDS trains a machine learning classification algorithm on the 20 training data sets and generates 20 trained machine learning models. A generic computer using a generic program cannot generate trained machine learning models corresponding to the training data sets by training each machine learning classification algorithm using the training data sets and the computed primary key-foreign key features for the training data sets in accordance with the method steps disclosed above.

The machine learning relationship determination system (MLRDS) generates 107 validated machine learning models for each of the machine learning classification algorithms on testing the generated trained machine learning models corresponding to the training data sets with the validation data set using the computed primary key-foreign key features of the validation data set. As used herein, "validated machine learning models" refers to the trained machine learning models that are tested against the positive validation data and the negative validation data of the validation data set. Consider an example where the MLRDS generates 20 trained machine learning models using the 20 training data sets, and the number of predetermined inclusion dependency pairs in a validation data set is 60. The 20 trained machine learning models are tested against 60 predetermined inclusion dependency pairs in the validation data set. The test outputs of the 20 trained machine learning models to the validation data set are tabulated with expected outputs, that is, the predetermined output values of the validation data set.

On comparison of the test outputs of the 20 trained machine learning models to the 60 predetermined inclusion dependency pairs in the validation data set with the expected outputs of the 60 predetermined inclusion dependency pairs in the validation data set, the machine learning relationship determination system (MLRDS) computes parameters, for example, a YES COUNT and a % YES for every predetermined inclusion dependency pair in the validation data set. The parameter YES COUNT refers to the number of trained machine learning models that predict a predetermined inclusion dependency pair in the validation data set to be a primary key-foreign key pair. That is, the trained machine learning model predicts the predetermined inclusion dependency pair in the validation data set to be a primary key-foreign key pair and indicates the primary key-foreign key flag of the predetermined inclusion dependency pair with a "Y". The % YES refers to a percentage of trained machine learning models that output a "Y" primary key-foreign key flag to the predetermined inclusion dependency pair in the validation data set. The % YES is given by (YES COUNT*100) divided by the total number of trained machine learning models.

Four combinations of test outputs and expected outputs of the trained machine learning model for a predetermined inclusion dependency pair in the validation data set can be obtained as follows: If the expected output for the predetermined inclusion dependency pair is a YES and the test output for the predetermined inclusion dependency pair is a YES, the test output of the trained machine learning model is a true positive. If the expected output for the predetermined inclusion dependency pair is a YES and the test output for the predetermined inclusion dependency pair is a NO, the test output of the trained machine learning model is a false negative. If the expected output for the predetermined inclusion dependency pair is a NO and the test output for the predetermined inclusion dependency pair is a NO, the test output of the trained machine learning model is a true negative. If the expected output for the predetermined inclusion dependency pair is a NO and the test output for the predetermined inclusion dependency pair is a YES, the output of the trained machine learning model is a false positive. The possible test outputs of the trained machine learning models to the validation data set are true positive, false positive, true negative, and false negative.

The machine learning relationship determination system (MLRDS) generates validated machine learning models for each of the machine learning classification algorithms on testing the generated trained machine learning models with the predetermined inclusion dependency pairs in the validation data set. Each predetermined inclusion dependency pair in the validation data set has a corresponding YES COUNT and % YES parameters computed using the test outputs of the generated trained machine learning models. A generic computer using a generic program cannot generate validated machine learning models for each of the machine learning classification algorithms on testing the generated trained machine learning models corresponding to the training data sets with the validation data set using the computed primary key-foreign key features of the validation data set in accordance with the method steps disclosed above.

The machine learning relationship determination system (MLRDS) further determines 108 an optimum algorithm decision threshold for each of the machine learning classification algorithms using the generated validated machine learning models. As used herein, an "optimum algorithm decision threshold" refers to an optimum value of a decision threshold. Also, as used herein, a "decision threshold" refers to a number of validated machine learning models whose output for a predetermined inclusion dependency pair in the validation data set needs to be "Y" to confirm that the inclusion dependency pair is a primary key-foreign key pair. The inclusion dependency pair that is a non-primary key-foreign key pair is indicated by N. The optimum algorithm decision threshold is a value of the decision threshold where the number of false positive outputs of the validated machine learning models is substantially less and the number of true positive outputs of the validated machine learning models is substantially high. The % YES parameter along with the number of predetermined inclusion dependency pairs of the validation data set with expected outputs as YES and expected outputs as NO are tabulated in a descending order ranging from 100 to 0. The % YES parameter is the decision threshold.

The machine learning relationship determination system (MLRDS) also tabulates cumulative YES COUNT and cumulative NO COUNT in the validation data set. The cumulative YES COUNT represents the number of instances of the validation data set with true positive outputs and the cumulative NO COUNT represents the number of instances of the validation data set with false positive outputs. As used herein, "instances of the validation data set" refer to the predetermined inclusion dependency pairs of the validation data set. A 100% YES extreme condition corresponds to a decision threshold that confirms an inclusion dependency pair to be a primary key-foreign key pair only if all the validated machine learning models output that the inclusion dependency pair is a primary key-foreign key pair. A 0% YES extreme condition corresponds to a decision threshold that confirms an inclusion dependency pair to be a primary key-foreign key pair irrespective of the output of the validated machine learning models. The MLRDS facilitates selection of the optimum algorithm decision threshold between the two extreme conditions such that the number of false positive outputs is minimized and the number of true positive outputs is maximized. The MLRDS stores the selected optimum algorithm decision threshold for each machine learning classification algorithm in a threshold database. A generic computer using a generic program cannot determine an optimum algorithm decision threshold for each of the machine learning classification algorithms using the generated validated machine learning models in accordance with the method steps disclosed above.

Using the optimum algorithm decision threshold, the machine learning relationship determination system (MLRDS) determines 109 a resultant of the inclusion dependency pair of the prospective primary key and the prospective foreign key being a primary key-foreign key pair or a non-primary key-foreign key pair for each of the machine learning classification algorithms. The MLRDS subjects the inclusion dependency pair of the prospective primary key and the prospective foreign key to the validated machine learning models using the computed primary key-foreign key features of the inclusion dependency pair of the prospective primary key and the prospective foreign key. The MLRDS receives the outputs of the validated machine learning models and based on the optimum algorithm decision threshold, the MLRDS determines whether the inclusion dependency pair of the prospective primary key and the prospective foreign key is a primary key-foreign key pair or a non-primary key-foreign key pair. The MLRDS iterates the process of determining whether the inclusion dependency pair of the prospective primary key and the prospective foreign key is a primary key-foreign key pair or a non-primary key-foreign key pair for each machine learning classification algorithm. A generic computer using a generic program cannot determine a resultant of the inclusion dependency pair of the prospective primary key and the prospective foreign key being a primary key-foreign key pair or a non-primary key-foreign key pair for each of the machine learning classification algorithms in accordance with the method steps disclosed above.

The machine learning relationship determination system (MLRDS) then performs 110 majority voting on the determined resultant for each of the machine learning classification algorithms to determine a primary key-foreign key relationship among the data in the selected first column of data of the first table and the selected second column of data of the second table, that is, to confirm that a primary key-foreign key relationship between the prospective primary key and the prospective foreign key exists. A generic computer using a generic program cannot perform majority voting on the determined resultant of each of the machine learning classification algorithms to determine a primary key-foreign key relationship among the data in the selected first column of data of the first table and the selected second column of data of the second table in accordance with the method steps disclosed above.

The number of machine learning classification algorithms and the combination of the machine learning classification algorithms is configurable. In an embodiment, the machine learning relationship determination system (MLRDS) selects an odd number of machine learning classification algorithms for determining primary key-foreign key relationships among data in the selected first column and the selected second column. On performing majority voting on the determined resultants for the odd number of machine learning classification algorithms, the MLRDS obtains a clear majority of the resultants which enables the MLRDS to quickly determine the final resultant of the odd number of machine learning classification algorithms. The MLRDS obtains a clear majority of the resultants of the odd number of machine learning classification algorithms when the number of machine learning classification algorithms with the same resultant is greater than 50% of the odd number of machine learning classification algorithms. In another embodiment, the MLRDS selects an even number of machine learning classification algorithms for determining primary key-foreign key relationships among data in the selected first column and the selected second column. On performing majority voting on the determined resultants for the even number of machine learning classification algorithms, the MLRDS will not obtain a clear majority of resultants. In this embodiment, the MLRDS receives a selection of a minimum limit of 50% of the even number of machine learning classification algorithms to define a majority from the user device. That is, the resultants of 50% or more of the even number of machine learning classification algorithms define the majority.

On implementing the method disclosed herein, the end result generated by the machine learning relationship determination system (MLRDS) is a tangible determination of primary key-foreign key relationships among data in the tables of the target database. Determination of primary key-foreign key relationships maintains referential integrity of the tables in the target database. With the referential integrity, the quality of data stored in the tables of the target database is boosted. With the referential integrity maintained, writing custom programming codes for the tables individually is eliminated and chances of bugs in the programming code is reduced. There will also be consistency in data references across application programs that access the tables in the target database, thereby reducing the time for development of the application programs.

In the method disclosed herein, the machine learning relationship determination system (MLRDS) determines primary key-foreign key relationships between data in tables whose metadata is not updated or maintained. The MLRDS utilizes a combination of machine learning classification algorithms for determining the primary key-foreign key relationships. The machine learning classification algorithms recognize hidden patterns in the computed primary key-foreign key features of the training data and apply the hidden patterns on the data of the tables for determining the primary key-foreign key relationships. The primary key-foreign key features of the training data are selected in such a way that the machine learning classification algorithms are trained on all possible combinations and patterns of the training data. The primary key-foreign key features are also interdependent.

The method disclosed herein provides an improvement in computer related technology related to machine learning as follows: On implementing the method disclosed herein by the machine learning relationship determination system (MLRDS), the primary key-foreign key relationships between data in the tables are determined where data flow between the tables in the target database is affected due to any kind of perturbation, for example, deletion, insertion, etc., which results in the metadata of the tables not being updated. The MLRDS facilitates the search for the primary key and foreign key of the tables by eliminating column pairs in tables that do not satisfy the condition of inclusion dependency. On eliminating the non-inclusion dependency pairs, there may still be a large number of column pairs with inclusion dependency. For the identified inclusion dependency pairs, the MLRDS uses a combination of machine learning classification algorithms to classify a large number of inclusion dependency pairs in a short duration, thereby reducing human intervention and achieving the classification of the inclusion dependency pairs into primary key-foreign key pairs and non-primary key-foreign key pairs with computation intensive processors. The combination of machine learning classification algorithms recognize hidden characteristics of already known primary key-foreign key pairs and apply the hidden characteristics to identify new inclusion dependency pairs that have primary key-foreign key relationships. To identify the inclusion dependency pairs from the tables of the target database, compute the primary key-foreign key features, generate trained and validated machine learning models using the training data sets and the validation data set, determine an optimum algorithm threshold for each of the machine learning classification algorithms, determine a resultant of the inclusion dependency pair being a primary key-foreign key pair or a non-primary key-foreign key pair, and perform majority voting on the determined resultant for each of the machine learning classification algorithms requires six or more separate computer programs, the execution of which cannot be performed by a person using a generic computer.

The data inputted to the machine learning relationship determination system (MLRDS), for example, the training data for training the machine learning classification algorithms, the validation data set for validating the trained machine learning models, the identified inclusion dependency pairs, the optimum decision threshold, and an acceptable accuracy for a trained machine learning model is transformed, processed, and executed by an algorithm in the MLRDS. In splitting the training data into multiple training data sets, the MLRDS transforms the training data for training the machine learning classification algorithms to ensure an adequate combination of the positive training data and the negative training data in each training data set. In computing the primary key-foreign key features, for example, a name similarity index of the training data, the validation data set, and the identified inclusion dependency pairs, the MLRDS transforms the training data, the validation data set, and the identified inclusion dependency pairs, for example, into respective sound codes using the Metaphone algorithm. The MLRDS transforms the optimum algorithm decision threshold to a whole number of validated machine learning models whose output to a predetermined inclusion dependency pair in the validation data set is "Y" to confirm that the predetermined inclusion dependency pair is a primary key-foreign key pair. The MLRDS uses the whole number of the validated machine learning models to determine a resultant of the identified inclusion dependency pairs from the tables of the target database being primary key-foreign key pairs or non-primary key-foreign key pairs. The MLRDS transforms the acceptable accuracy of the trained machine learning models from a percentage value to a whole number to compare the output of the trained machine learning models to the expected output in the validation data set, on validating with the trained machine learning models against the validation data set. The determined primary key-foreign key relationships control any transformation of the data in the target database.

To obtain a complete insight of the data in the target database, it is important to know the relationship between the data in various columns in a schema. One of the relationships is a primary key-foreign key relationship.

Determining the primary key-foreign key relationship among the columns in a large target database schema is challenging if explicit information about the schema is not available. The precondition of inclusion dependency solves the problem of evaluating each pair of columns of the target database for determining a primary key-foreign key relationship to some extent but the problem is still significant for a manual determination of a primary key-foreign key relationship. Machine learning classification algorithms recognize the hidden characteristics of already known primary key-foreign key pairs and apply the same characteristics to determine the primary key-foreign key relationship among the identified inclusion dependency pairs. On implementing a combination of machine learning classification algorithms, the machine learning relationship determination system (MLRDS) improves the prediction accuracy and computation time of determining primary key-foreign key relationships among the data in the target database. This is because some machine learning classification algorithms are optimally suited for a particular type of data than others and allow identification and learning from certain patterns in the data. The method disclosed herein provides a specialized way to utilize appropriate primary key-foreign key features and a combination of appropriate machine learning classification algorithms to determine the primary key-foreign key relationships between the data in the target database. By determining the primary key-foreign key relationships between the data in the target database, the MLRDS addresses the problems of detection of flow of the data in the target database or other data analytics, for example, determining a source of information in an executive report in a short duration with an improved accuracy.

Figure 2:
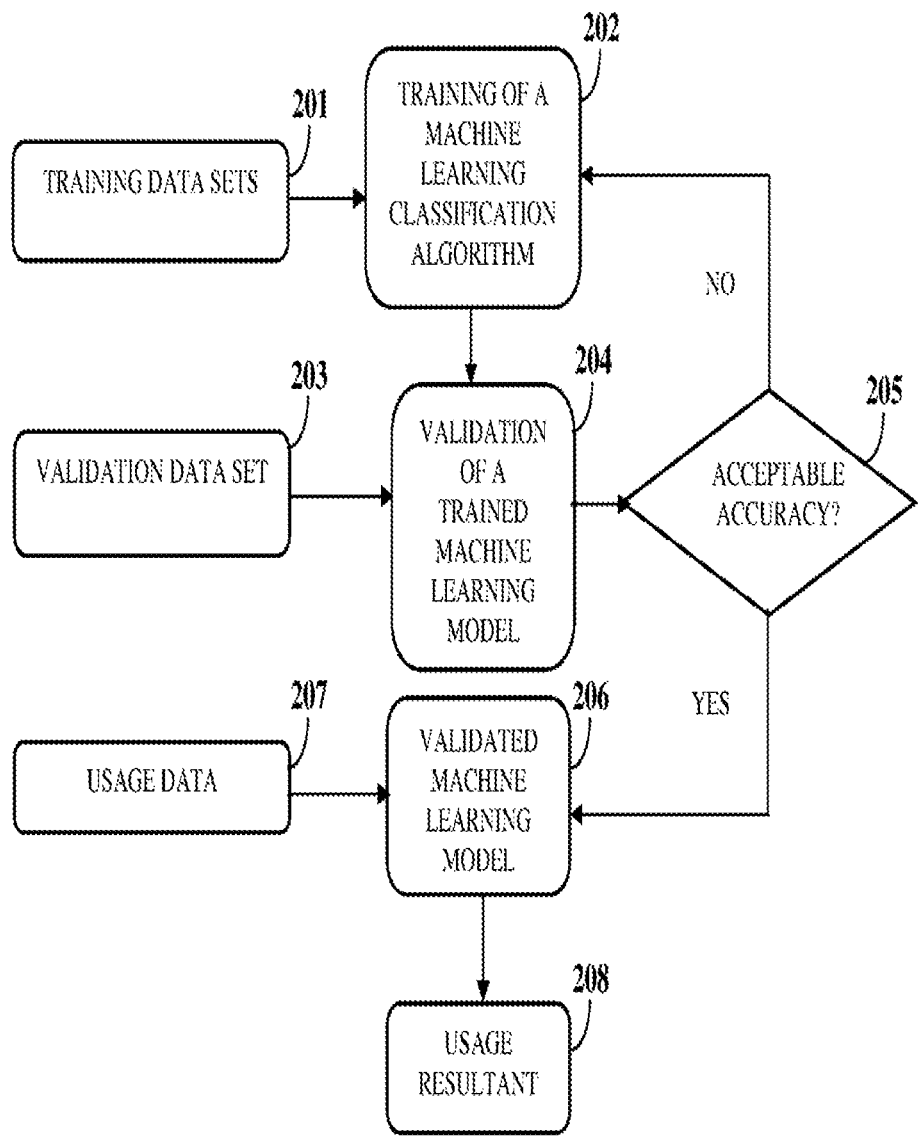
FIG. 2 exemplarily illustrates a flowchart comprising the steps performed by a machine learning relationship determination system for training and validating a machine learning classification algorithm and for determining primary key-foreign key relationships between data in multiple tables of a target database.

FIG. 2 exemplarily illustrates a flowchart comprising the steps performed by the machine learning relationship determination system (MLRDS) for training and validating a machine learning classification algorithm and for determining primary key-foreign key relationships between data in multiple tables of the target database. The MLRDS receives training data and splits the training data into multiple training data sets 201. The MLRDS also receives a validation data set 203 from a source database. The MLRDS uses the training data sets 201 as input for training 202 a machine learning classification algorithm. On training 202 the machine learning classification algorithm, the MLRDS generates trained machine learning models as disclosed in detailed description of FIGS. 1A-1B. The MLRDS validates 204 the generated trained machine learning models against the validation data set 203 using predetermined inclusion dependency pairs in the validation data set 203.

The machine learning relationship determination system (MLRDS) determines 205 whether the trained machine learning model has an acceptable accuracy. The accuracy of the trained machine learning model refers to the number of times the trained machine learning model makes a correct prediction of a primary key-foreign key relationship for an inclusion dependency pair in the validation data set 203 when compared with the expected output for the inclusion dependency pair in the validation data set 203. In an embodiment, a user of the MLRDS configures the acceptable accuracy for a trained machine learning model. If the trained machine learning model exhibits the acceptable accuracy against the validation data set 203, the MLRDS generates a validated machine learning model 206 from the trained machine learning model. If the trained machine learning model does not exhibit the acceptable accuracy against the validation data set 203, the MLRDS re-trains the trained machine learning model until the acceptable accuracy 205 is met. That is, the MLRDS generates the validated machine learning model 206 for each of the machine learning classification algorithms 202 when the generated trained machine learning model corresponding to the training data sets 201 meets a predetermined criterion, that is, the acceptable accuracy, on testing the generated trained machine learning model against the validation data set 203. The MLRDS retrains the generated trained machine learning model on the training data sets 201 until the generated trained machine learning model meets the predetermined criterion, that is, the acceptable accuracy, for the generation of the validated machine learning model 206 for each of the machine learning classification algorithms 202. The MLRDS inputs the usage data 207, that is, the data in the tables of the target database to the validated machine learning model 206. The validated machine learning model 206 outputs a usage resultant 208, that is, the determined primary key-foreign key relationships among the usage data 207 in the tables of the target database. The validated machine learning model 206 determines whether the usage data 207 is a primary key-foreign key pair or a non-primary key-foreign key pair.

FIGS. 3A-9 exemplarily illustrate an example for determining primary key-foreign key relationships among data in tables 301 and 302 of a target database by the machine learning relationship determination system (MLRDS) through machine learning.

Figure 3A:
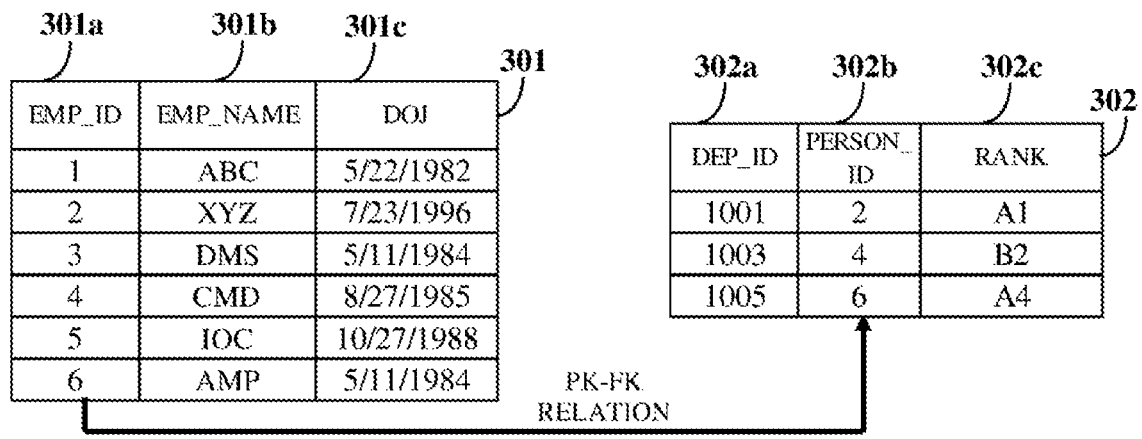
FIGS. 3A-3B exemplarily illustrate two tables of a target database with respective columns whose primary key-foreign key relationship is to be determined.
Figure 3B:
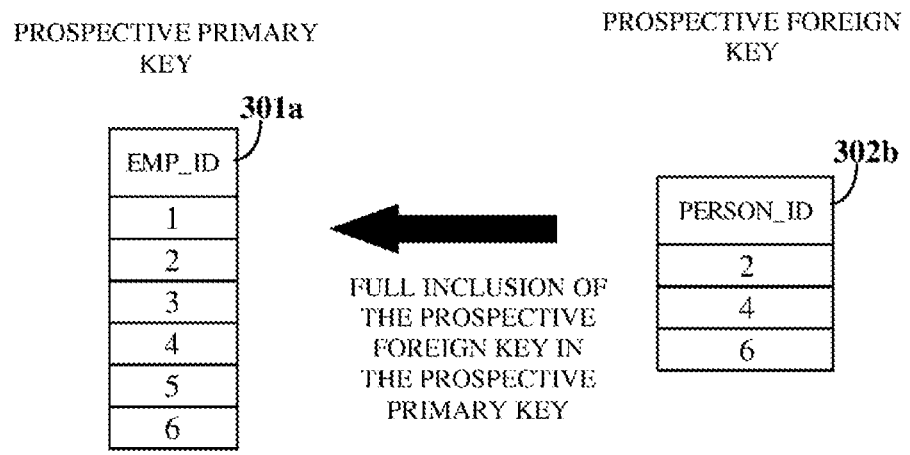

FIGS. 3A-3B exemplarily illustrate two tables 301 and 302 of a target database with respective columns 301a, 301b, 301c, 302a, 302b, and 302c whose primary key-foreign key relationship is to be determined. For a primary key-foreign key relationship to exist between the tables 301 and 302, a condition of inclusion dependency has to be satisfied by the columns 301a, 301b, 301c, 302a, 302b, and 302c of the tables 301 and 302 as disclosed in the detailed description of FIGS. 1A-1B. The machine learning relationship determination system (MLRDS) selects the column 301a from the table 301 and the column 302a from the table 302. The MLRDS determines whether all the data elements in the column 302a are present in the column 301a. Since all the data elements in the column 302a are not a subset of the data elements in the column 301a, the column 302a has no inclusion dependency with the column 301a. The MLRDS selects the column 301a and the column 302b from the tables 301 and 302 respectively. The data elements in the column 302b are a subset of the data elements in the column 301a. The column 301a and the column 302b therefore satisfy the condition of inclusion dependency even though the names of the column 301a and the column 302b are different. Therefore, the MLRDS identifies the column 301a as a prospective primary key and the column 302b as a prospective foreign key and the tables 301 and 302 are a prospective parent table and a prospective child table respectively.

The machine learning relationship determination system (MLRDS) receives multiple predetermined inclusion dependency pairs comprising primary key-foreign key pairs and non-primary key-foreign key pairs from a source database. The primary key-foreign key pairs are classified into positive training data and positive validation data. The non-primary key-foreign key pairs are classified into negative training data and negative validation data. The positive training data and the negative training data are used to train each of the selected machine learning classification algorithms and the positive validation data and the negative validation data are used to validate each of the selected machine learning classification algorithms. Consider an example where the MLRDS receives 2050 predetermined inclusion dependency pairs comprising positive training data and negative training data as training data to train a machine learning classification algorithm. Out of the 2050 predetermined inclusion dependency pairs, 50 predetermined inclusion dependency pairs constitute the positive training data and 2000 predetermined inclusion dependency pairs constitute the negative training data. The MLRDS splits the positive training data and the negative training data into multiple training data sets.

Figure 4:
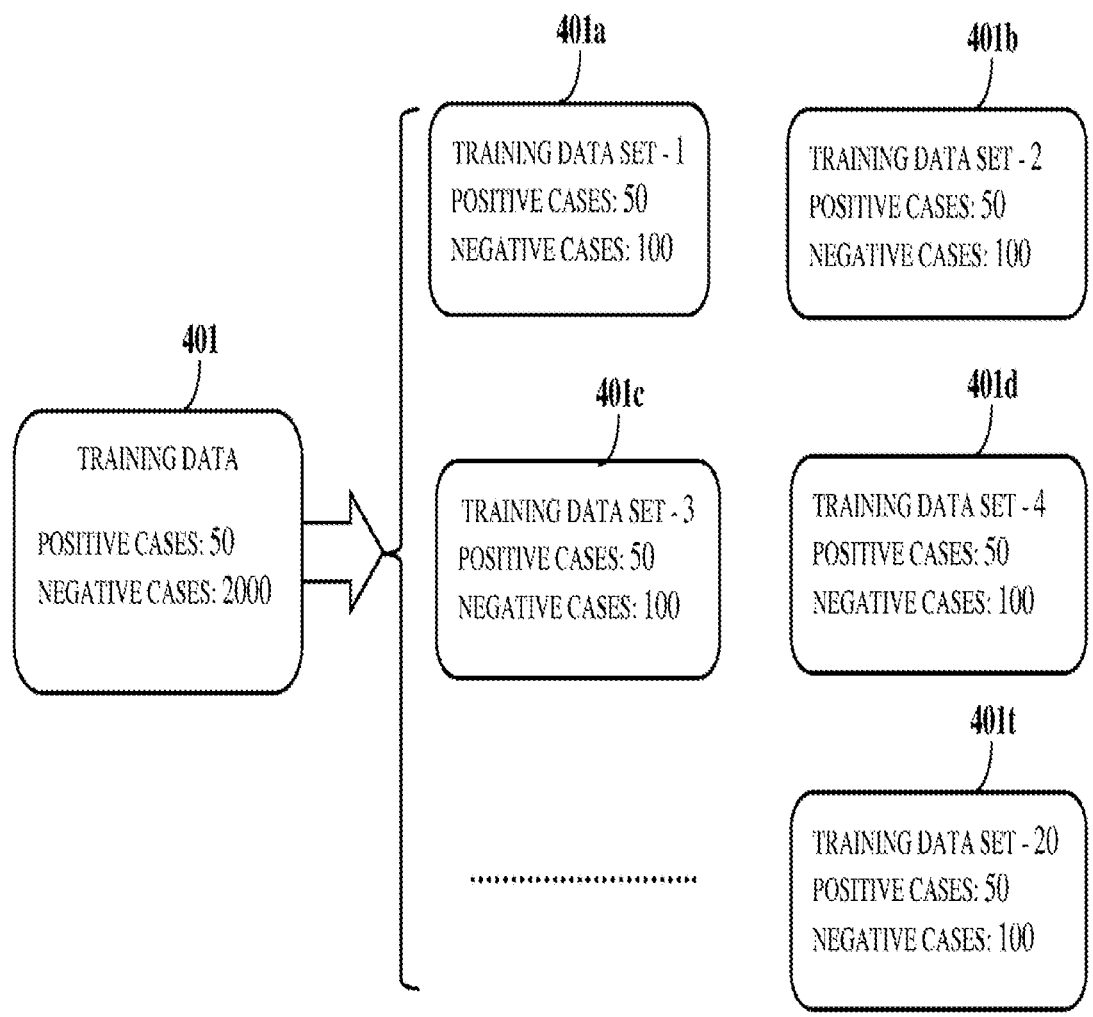
FIG. 4 exemplarily illustrates a schematic representation showing splitting of positive training data and negative training data into multiple training data sets.

FIG. 4 exemplarily illustrates a schematic representation showing splitting of the positive training data and the negative training data into multiple training data sets 401a, 401b, 401c, 401d, . . . , and 401t. The machine learning relationship determination system (MLRDS) determines a ratio of the positive training data to the negative training data as 1:2 in each of the training data sets 401a, 401b, 401c, 401d, . . . , and 401t. The MLRDS splits the training data 401 into (2000)/(50*2)=20 training data sets 401a, 401b, 401c, 401d, . . . , and 401t. Each of the training data sets 401a, 401b, 401c, 401d, . . . , and 401t, has 50 primary key-foreign key pairs and 100 non-primary key-foreign key pairs. The MLRDS also receives validation data as a validation data set comprising 1200 predetermined inclusion dependency pairs as exemplarily illustrated in FIG. 5. The 1200 predetermined inclusion dependency pairs are classified into 50 primary key-foreign key pairs and 1150 non-primary key-foreign key pairs. The 50 primary key-foreign key pairs constitute the positive validation data and the 1150 non-primary key-foreign key pairs constitute the negative validation data.

The machine learning relationship determination system (MLRDS) computes multiple primary key-foreign key features for the inclusion dependency pairs of the prospective primary key and the prospective foreign key identified from the tables 301 and 302 in FIG. 3A. The MLRDS also computes primary key-foreign key features for the predetermined inclusion dependency pairs in the training data sets and the validation data set. The MLRDS uses a combination of machine learning classification algorithms, for example, the J48 algorithm, the k-Nearest Neighbors algorithm, the Random Forest algorithm, the Naive Bayes algorithm, a support vector machine model, etc., for identifying primary key-foreign key pairs and non-primary key-foreign key pairs from the inclusion dependency pairs of the prospective primary key and the prospective foreign key identified from the tables 301 and 302. The MLRDS trains each of the machine learning classification algorithms on the computed primary key-foreign key features of the training data sets. The machine learning classification algorithm learns from the patterns in the computed primary key-foreign key features of the training data sets. For each of the training data sets 401a, 401b, 401c, 401d, . . . , and 401t exemplarily illustrate in FIG. 4, on which the machine learning classification algorithm, for example, the Random Forest algorithm, is trained, the MLRDS generates a trained machine learning model. Thus, the MLRDS generates 20 trained Random Forest models. The MLRDS tests the 20 trained Random Forest models against the validation data set.

FIG. 5 exemplarily illustrates a table 501 containing test outputs of the trained machine learning models, that is, the 20 trained Random Forest models, obtained by the machine learning relationship determination system (MLRDS) on testing the 20 trained Random Forest models against the validation data set. In the table 501, column INSTANCE refers to instance identifier (ID) and column ACTUAL RESULT indicates whether an instance is an actual primary key-foreign key pair or not. For each instance of the validation data set, the MLRDS tabulates the test outputs of the 20 trained Random Forest models obtained based on the computed primary key-foreign key features of the validation data set against an expected output. The MLRDS computes parameters YES COUNT and % YES for each instance of the validation data set. A YES output of the trained Random Forest model is indicated by a primary key-foreign key flag "Y" and a NO output of the trained Random Forest model is indicated by a primary key-foreign key flag "N" in the table 501.

Consider instance 2 of the validation data set exemplarily illustrated in FIG. 5. The number of trained Random Forest models that output "Y" is 4 as indicated in the YES COUNT column of the table 501. The machine learning relationship determination system (MLRDS) computes the % YES parameter as (YES COUNT*100) divided by the total number of trained Random Forest models=4*100/20=20% as indicated in the % YES column of the table 501. In a similar manner, MLRDS computes the parameters YES COUNT and % YES for all the 1200 predetermined inclusion dependency pairs in the validation data set. The MLRDS retrains the Random Forest models until the trained Random Forest models exhibit an acceptable accuracy on testing the Random Forest models with the validation data set. Using the acceptable accuracy, the MLRDS generates validated Random Forest models. Using the validated Random Forest models, the MLRDS determines an optimum algorithm decision threshold for determining whether the inclusion dependency pairs identified from the tables 301 and 302 exemplarily illustrated in FIG. 3A, are primary key-foreign key pairs or non-primary key-foreign key pairs.

FIG. 6 exemplarily illustrates a table 601 containing a number of instances of the validation data set that defines a primary key-foreign key relationship between the instances of the validation data set for determining the optimum algorithm decision threshold using validated machine learning models, that is, the 20 validated Random Forest models disclosed in the detailed description of FIG. 5. The machine learning relationship determination system (MLRDS) tabulates the number of instances of the validation data set with true positive outputs of the validated Random Forest models under the column COUNT ACTUAL "YES" for each % YES value in the table 601. The MLRDS also tabulates the number of instances of the validation data set with false positive outputs of the validated Random Forest models under the column COUNT ACTUAL "NO" for each % YES value in the table 601. For a 100% YES value in the table 601, the total number of instances where the test output of all the 20 trained Random Forest models is "Y", is 5 as indicated in the column COUNT in the table 601. Out of the 5 instances, the number of instances where the expected output is also "Y" is 4 as indicated in the column COUNT ACTUAL "YES" in the table 601. In 1 remaining instance, the expected output is "N", while the test output of the 20 trained Random Forest models is "Y" as indicated in the column COUNT ACTUAL "NO" in the table 601. The 20 trained Random Forest models inaccurately predicted the primary key-foreign key relationship for the 1 remaining instance of the validation data set. Similarly, the MLRDS tabulates the COUNT ACTUAL "YES" and the COUNT ACTUAL "NO" parameters for all values under the % YES column exemplarily illustrated in the table 501 in FIG. 5, ranging from O to 100 in descending order. The MLRDS also computes a cumulative number of the values in the column COUNT ACTUAL "YES" and a cumulative number of the values in the column COUNT ACTUAL "NO" for each % YES parameter from 100% to 0%.

FIG. 7 exemplarily illustrates a table 701 containing a cumulative number of instances of the validation data set that defines a primary key-foreign relationship between the instances of the validation data set for determining the optimum algorithm decision threshold using the validated Random Forest models. For a value of % YES, the cumulative number of instances of the validation data set for which the test output of the trained Random Forest models is a true positive is indicated in the column CUMULATIVE "YES" in the table 701. For a value of % YES, the cumulative value for the number of instances of the validation data set for which the test output of the trained Random Forest models is a false positive is indicated in the column CUMULATIVE "NO" in the table 701. For a % YES value 100, the value in the column CUMULATIVE "YES" is 4 as the value in the column COUNT ACTUAL "YES" is 4, and the value in the column CUMULATIVE "NO" is 1 as the value in the column COUNT ACTUAL "NO" is 1 as disclosed in the detailed description of FIG. 6. For a YES % 50, the COUNT is 220, the value in the column COUNT ACTUAL "YES" is 70, and the value in the column COUNT ACTUAL "NO" is 150. The value in the column CUMULATIVE "YES" is 4+70=74, and the value in the column CUMULATIVE "NO" is 1+150=151. Using the cumulative number of instances of the validation data set, the machine learning relationship determination system (MLRDS) determines the optimum value of % YES where the number of true positive outputs of the validated machine learning models is more while reducing the number of false positive outputs of the validated machine learning models. The % YES is the decision threshold and the optimum value of % YES is the optimum algorithm decision threshold.

Figure 8:
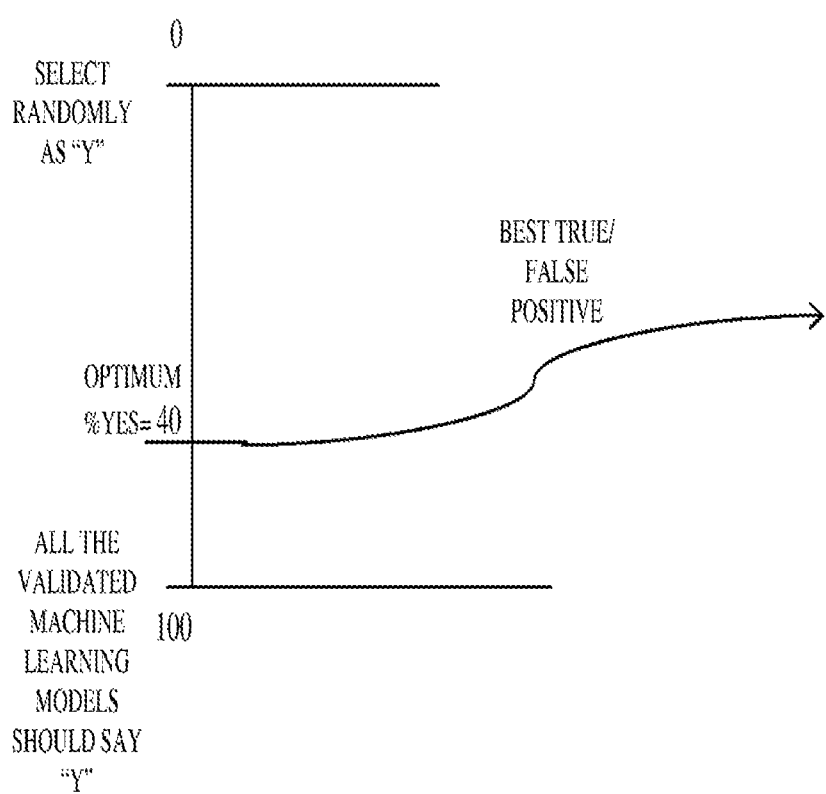
FIG. 8 exemplarily illustrates a schematic representation for determining the optimum algorithm decision threshold using the validated machine learning models.

FIG. 8 exemplarily illustrates a schematic representation for determining the optimum algorithm decision threshold using the validated Random Forest models. The machine learning relationship determination system (MLRDS) facilitates selection of an optimum value of % YES between extreme conditions of O and 100. As exemplarily illustrated in FIG. 8, the number of true positive outputs and the number of false positive outputs reduce as % YES reduces from 100% to 0%. The optimum algorithm decision threshold is selected in such a way that the loss of the number of true positive outputs is as minimum as possible and the number of false positive outputs is reduced as much as possible. For reducing the number of false positive outputs, the value of % YES is decreased but there is also a decrease in the number of true positive outputs which is to be avoided. Hence, the optimum algorithm decision threshold is selected as the level of % YES where a slight jump towards the next value of % YES will result in either a substantial loss of the number of true positive outputs or a minimal gain towards reducing the number of false positive outputs. For a value of % YES more than 40, the number of true positive outputs is more while the number of false positive outputs also increases. For value of % YES less than 40, the number of true positive outputs is reduced along with a reduction in the number of false positive outputs. However, for the value of % YES less than 40, 3 true positive outputs are lost at the cost of no reduction in the number of false positive outputs. Thus, the value of % YES as 40 is the optimum value of % YES where at the cost of 2 true positive outputs, 1970 false positive outputs are eliminated. The % YES as 40 is the optimum algorithm decision threshold. That is, if at least 40*20/100=8 validated Random Forest models predict an inclusion dependency pair 301a and 302b exemplarily illustrated in FIG. 3B, identified from the tables 301 and 302 exemplarily illustrated in FIG. 3A, as a primary key-foreign key pair, the resultant of the Random Forest algorithm for the inclusion dependency pair 301a and 302b is "Y".

The machine learning relationship determination system (MLRDS) inputs the identified inclusion dependency pair 301a and 302b exemplarily illustrated in FIG. 3B, with the computed primary key-foreign key features to the validated machine learning models of the machine learning classification algorithms. Using the optimum algorithm decision threshold, the validated machine learning models for each of the machine learning classification algorithms determine a resultant for the identified inclusion dependency pair 301a and 302b. The MLRDS performs majority voting on the resultant of the identified inclusion dependency pair 301a and 302b for each of the machine learning classification algorithms.

Figure 9:
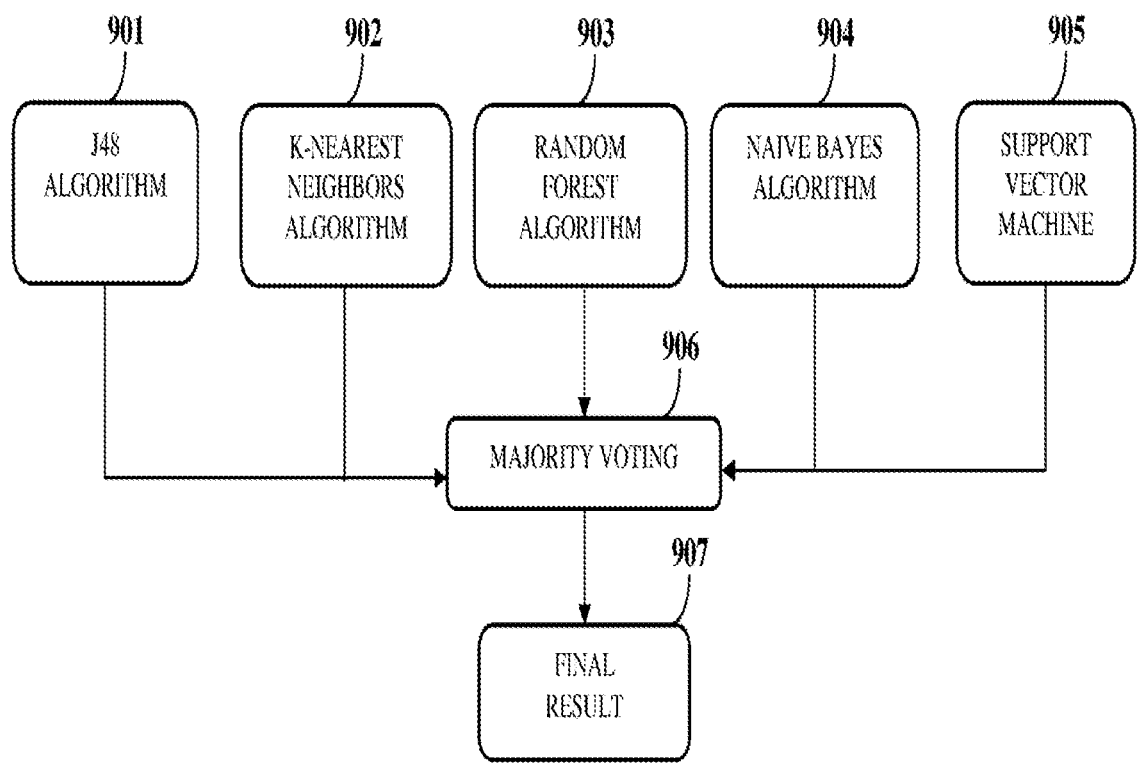
FIG. 9 exemplarily illustrates a flow diagram showing majority voting of a resultant of an identified inclusion dependency pair for each of multiple machine learning classification algorithms.

FIG. 9 exemplarily illustrates a flow diagram showing majority voting of the resultant of the identified inclusion dependency pair 301a and 302b for each of the machine learning classification algorithms. The machine learning relationship determination system (MLRDS) subjects the resultants of the J48 algorithm 901, the k-Nearest Neighbors algorithm 902, the Random Forest algorithm 903, the Naive Bayes algorithm 904, and the support vector machine model 905 to majority voting 906 for determining a primary key-foreign key relationship among the data in the column 301a of the table 301 and the column 302b of the table 302 exemplarily illustrated in FIGS. 3A-3B. The majority of the resultants of the machine learning classification algorithms 901, 902, 903, 904, and 905 provides a final result 907 indicated by a primary key-foreign key flag "Y" or "N" for the primary key-foreign key relationship between the identified inclusion dependency pair 301a and 302b exemplarily illustrated in FIG. 3B.

FIGS. 10A-21 exemplarily illustrate another example for determining primary key-foreign key relationships among data in tables 1001a and 1001b of a target database by the machine learning relationship determination system (MLRDS) through machine learning.

FIGS. 10A-10B exemplarily illustrate two tables T1 1001a and T2 1001b of a target database with respective columns whose primary key-foreign key relationship is to be determined. The machine learning relationship determination system (MLRDS) employs at least one processor configured to execute computer program instructions for determining primary key-foreign key relationships among data in the tables T1 1001a and T2 1001b. Table T1 1001a is an employee information table with five columns, for example, EMP_ID, EMP_FIRST_NAME, SURNAME, DATE OF JOINING, and YEARS OF EXP. Table T2 1001b is a medical checkup information table with four columns, for example, CHECKUP_ID, EMP_CODE, CHECKUP_DATE, and NO. OF TESTS. The MLRDS selects pairs of columns from the tables T1 1001a and T2 1001b to check for the condition of inclusion dependency between the tables T1 1001a and T2 1001b. The MLRDS selects a first column, for example, EMP_ID from the table T1 1001a and a second column, for example, EMP_CODE from the table T2 1001b. Since all the data elements in the column EMPCODE are a subset of the data elements in the column EMP_ID, the column pair (T1.EMP_ID, T2.EMP_CODE) satisfies the condition of inclusion dependency pair and hence may possess a primary key-foreign key relationship. The MLRDS identifies the column EMP_ID as the prospective primary key and the column EMP_CODE as the prospective foreign key. The MLRDS then selects the column EMP_ID from the table T1 1001a and the column NO. OF TESTS from the table T2 1001b. The MLRDS determines whether the column pair (T1.EMP_ID, T2. NO. OF TESTS) form an inclusion dependency pair. Since all the data elements in the column NO. OF TESTS are not a subset of the data elements in the column EMP_ID, the column pair (T1.EMP_ID, T2. NO. OF TEST) does not form an inclusion dependency pair and hence cannot be a primary key-foreign key pair. Similarly, the MLRDS identifies all the inclusion dependency pairs from the tables T1 1001a and T2 1001b. The MLRDS receives multiple predetermined inclusion dependency pairs comprising primary key-foreign key pairs classified as positive training data and positive validation data and non-primary key-foreign key pairs classified as negative training data and negative validation data from a source database.

FIG. 11 exemplarily illustrates a table 1101 from the source database containing training data. The machine learning relationship determination system (MLRDS) receives the training data comprising column pairs satisfying the condition of inclusion dependency and identified as primary key-foreign key pairs and non-primary key-foreign key pairs from the source database. As exemplarily illustrated in FIG. 11, the table 1101 contains six columns, for example, ID of the training data, TABLE_NAME_P, COLUMN_NAME_P, TABLE_NAME_D, COLUMN_NAME_D, and PK-FK FLAG. The column TABLE_NAME_P is an attribute of the table containing the primary key COLUMN_NAME_P. The column TABLE_NAME_D is an attribute of the table containing the foreign key COLUMN_NAME_D. The data elements in the columns TABLE_NAME_P and TABLE_NAME_D are names of the parent table and the child table respectively. The data elements in the columns COLUMN_NAME_P and COLUMN_NAME_D are the names of the primary key and the foreign key contained in the parent table and the child table respectively. The PK-FK flag is a primary key-foreign key flag identifying the predetermined inclusion dependency pair given by (TABLE_NAME_P. COLUMN_NAME_P, TABLE_NAME_D. COLUMN_NAME_D) as a primary key-foreign key pair or a non-primary key-foreign key pair. The primary key-foreign pair is indicated by "Y" and the non-primary key-foreign pair is indicated by "N". The column ID identifies an instance, that is, a predetermined inclusion dependency pair in the training data. In the table 1101, 1628 instances are available for training multiple machine learning classification algorithms. The number of primary key-foreign key pairs, that is, the positive training data is 37 identified by the primary key-foreign key flag as "Y". The remaining 1591 instances are non-primary key-foreign key pairs, that is, the negative training data, indicated by the primary key-foreign key flag as "N". The MLRDS splits the positive training data and the negative training data in the table 1101 into multiple training data sets as disclosed in the detailed description FIG. 13. The MLRDS also receives a validation data set comprising primary key-foreign key pairs and non-primary key-foreign key pairs from the source database.

FIG. 12 exemplarily illustrates a table 1201 from the source database containing the validation data set. The validation data set contains predetermined inclusion dependency pairs classified into positive validation data and negative validation data. The positive validation data is identified by "Y" as the primary key-foreign key flag in the column named PK-FK flag, and the negative validation data is identified by "N" as the primary key-foreign key flag in the column named PK-FK flag. The total number of predetermined inclusion dependency pairs in the validation data set in the table 1201 is 580. The number of primary key-foreign key pairs out of the 580 predetermined inclusion dependency pairs is 20. The remaining 560 predetermined inclusion dependency pairs are non-primary key-foreign key pairs.

Figure 13:
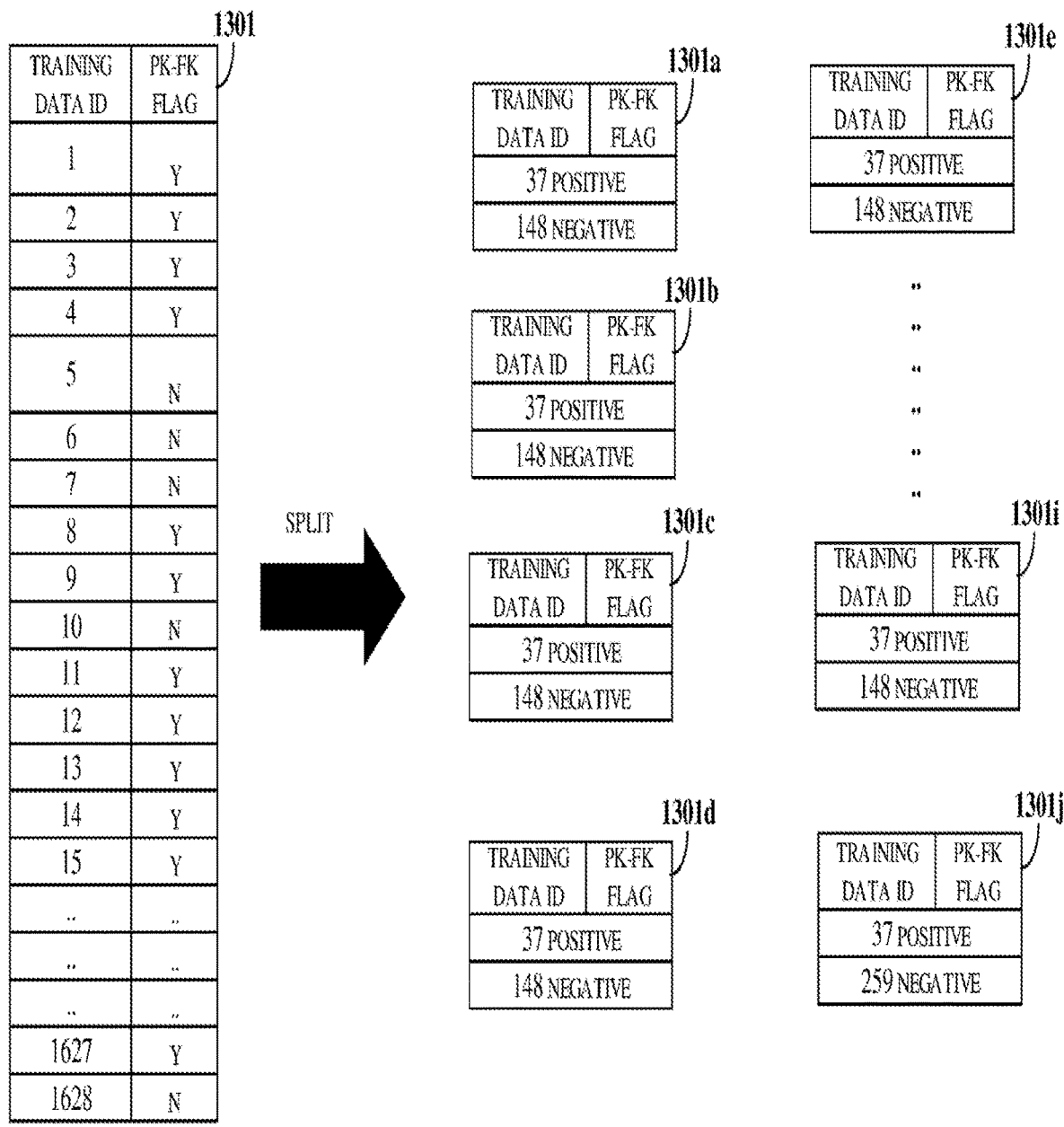
FIG. 13 exemplarily illustrates a schematic representation showing splitting of the training data into multiple training data sets.

FIG. 13 exemplarily illustrates a schematic representation showing splitting of the training data indicated in a table 1301 into multiple training data sets 1301a, 1301b, 1301c, 1301d, 1301e, . . . , 1301i, and 1301j. Since the number of primary key-foreign key pairs constituting the positive training data is 37 and the number of non-primary key-foreign key pairs constituting the negative training data is 1591 from the training data exemplarily illustrated in FIG. 11, the machine learning relationship determination system (MLRDS) splits the negative training data into multiple training data sets 1301a, 1301b, 1301c, 1301d, 1301e, . . . , 1301i, and 1301j and adds the positive training data to each of the training data sets 1301a, 1301b, 1301c, 1301d, 1301e, . . . , 1301i, and 1301j. The ratio of the positive training data to the negative training data in a training data set is predetermined, for example, 1:4. Thus, the training data is split into 1591/(37*4)=10.75 training data sets 1301a, 1301b, 1301c, 1301d, 1301e, . . . , 1301i, and 1301j. Rounding off to the closest whole number, the MLRDS splits the training data in the table 1101 exemplarily illustrated in FIG. 11, into 9 training data sets 1301a, 1301b, 1301c, 1301d, 1301e, . . . , 1301i with each having 148 non-primary key-foreign key pairs constituting the negative training data and 37 primary key-foreign key pairs constituting the positive training data. The last training data set 1301j has 259 non-primary key-foreign key pairs constituting the negative training data and 37 primary key-foreign key pairs constituting the positive training data since the MLRDS adds the remaining 111 non-primary key-foreign key pairs to the 148 non-primary key-foreign key pairs in the last training data set 1301j. The MLRDS computes multiple primary key-foreign key features for the training data in the table 1101, for the validation data set in the table 1201, and for the inclusion dependency pair of the prospective primary key and the prospective foreign key identified from the tables T1 1001a and T2 1001b exemplarily illustrated in FIGS. 10A-10B, as disclosed in the detailed description of FIGS. 1A-1B.

FIGS. 14A-14B exemplarily illustrate a table 1401 containing the training data of the table 1101 exemplarily illustrated in FIG. 11, with primary key-foreign key features computed for the training data by the machine learning relationship determination system (MLRDS). The MLRDS computes the primary key-foreign key features comprising, for example, a normalized rank sum, a unique foreign key ratio, a unique foreign share, a name pattern acceptance, a name similarity index, an element count ratio, and a distribution displacement for the instances, that is, the predetermined inclusion dependency pairs in the training data in the table 1101, as disclosed in detailed description of FIGS. 1A-1B.

FIGS. 15A-15B exemplarily illustrate a table 1501 containing the validation data set of the table 1201 exemplarily illustrated in FIG. 12, with primary key-foreign key features computed for the validation data set by the machine learning relationship determination system (MLRDS). The MLRDS computes the primary key-foreign key features for all the instances, that is, the predetermined inclusion dependency pairs in the validation data set in the table 1201 and generates the table 1501. The MLRDS uses a combination of machine learning classification algorithms, for example, the J48 algorithm, the k-Nearest Neighbors algorithm, the Naive Bayes algorithm, the Random Forest algorithm, the Bayes network model, the multilayer perceptron model, the support vector machine model, etc., for identifying primary key-foreign key pairs and non-primary key-foreign key pairs from the inclusion dependency pairs of the prospective primary keys and the prospective foreign keys identified from the tables T1 1001a and T2 1001b exemplarily illustrated in FIGS. 10A-10B.

Figure 16:
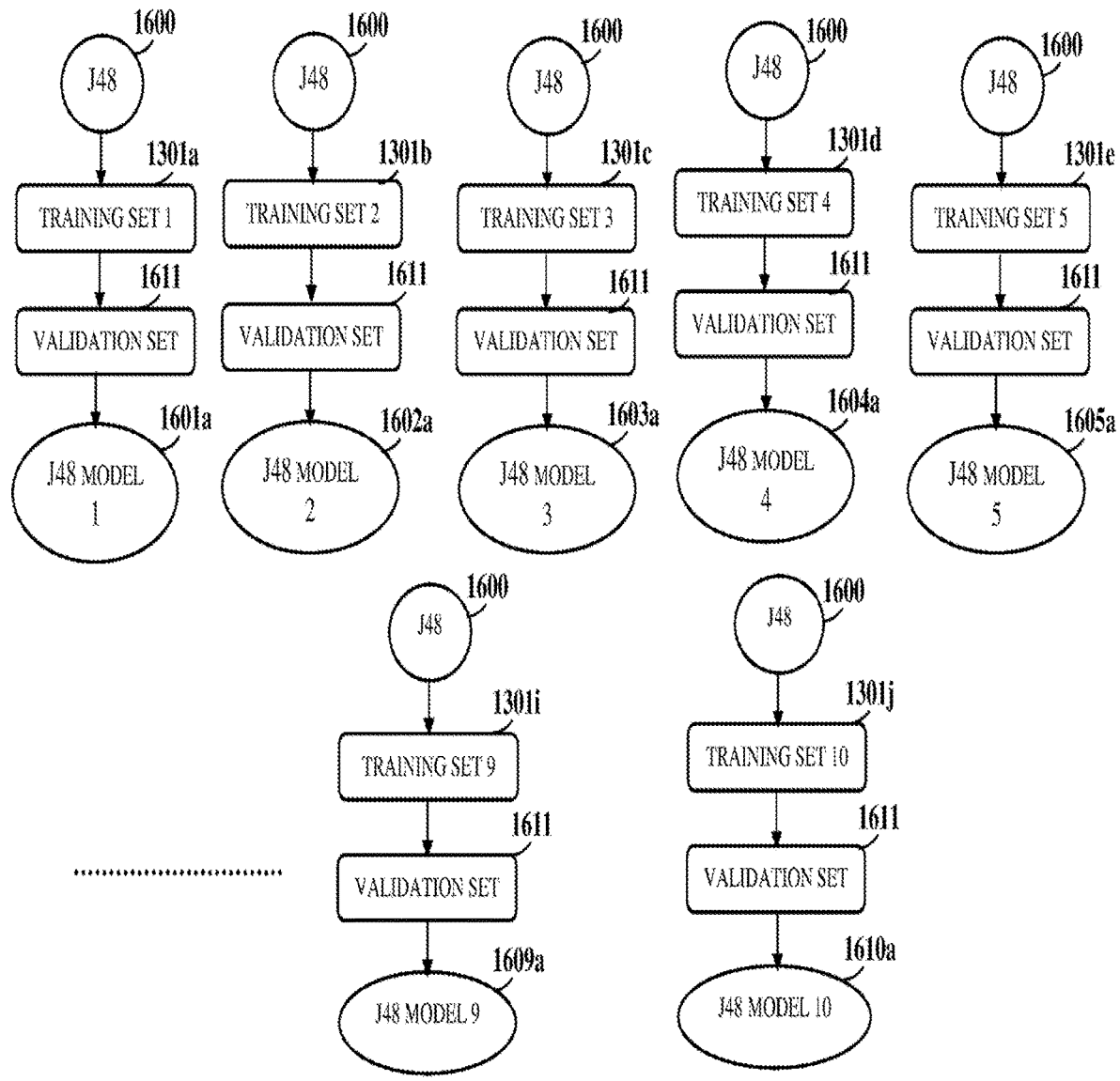
FIG. 16 exemplarily illustrates flowchart comprising the steps performed by the machine learning relationship determination system for generating validated machine learning models for a machine learning classification algorithm.

FIG. 16 exemplarily illustrates a flowchart comprising the steps performed by the machine learning relationship determination system (MLRDS) for generating validated machine learning models, for example, 1601a, 1602a, 1603a, 1604a, 1605a, . . . , 1609a, and 1610a for a machine learning classification algorithm, for example, the J48 algorithm 1600. The MLRDS generates trained machine learning models corresponding to the training data sets 1301a, 1301b, 1301c, 1301d, 1301e, . . . , 1301i, and 1301j exemplarily illustrated in FIG. 13, by training each of the machine learning classification algorithms using the training data sets 1301a, 1301b, 1301c, 1301d, 1301e, . . . , 1301i, and 1301j and the computed primary key-foreign key features of the training data sets 1301a, 1301b, 1301c, 1301d, 1301e, . . . , 1301i, and 1301j. For example, the MLRDS trains the J48 algorithm 1600 on trends and patterns in the computed primary key-foreign key features of the 10 training data sets 1301a, 1301b, 1301c, 1301d, 1301e, . . . , 1301i, and 1301j for predetermined output values of primary key-foreign key flags in the table 1401 exemplarily illustrated in FIGS. 14A-14B, and generates 10 trained J48 models. Once training is completed, the MLRDS validates the 10 trained J48 models against the validation data set 1611.

The machine learning relationship determination system (MLRDS) generates validated machine learning models for each of the machine learning classification algorithms on testing the generated trained machine learning models corresponding to the training data sets 1301a, 1301b, 1301c, 1301d, 1301e, . . . , 1301i, and 1301j with the validation data set 1611 and the computed primary key-foreign key features of the validation data set 1611. As exemplarily illustrated in FIG. 16, the validation data set 1611 in the table 1501 exemplarily illustrated in FIGS. 15A-15B is input to the 10 trained J48 models. Based on the training of the J48 algorithm 1600 on the training data in the table 1401, the 10 trained J48 models predict the primary key-foreign key relationships of the instances of the validation data set 1611 in the table 1501. If the test outputs of the 10 trained J48 models meet an acceptable accuracy, the MLRDS stores the 10 trained J48 models as validated J48 models 1601a, 1602a, 1603a, 1604a, 1605a, . . . , 1609a, and 1610a. The MLRDS validates the test outputs of the 10 trained J48 models for the validation data set 1611 in the table 1501 against the expected output for the validation data set 1611 in the table 1501. For example, the MLRDS validates all the trained J48 models against the same validation data set 1611 and the trained J48 models that exhibit a configurable accuracy of more than 50% on validation are stored as the validated J48 models 1601a, 1602a, 1603a, 1604a, 1605a, . . . , 1609a, and 1610a. The MLRDS repeats the training and the validation for another 4 machine learning classification algorithms and obtains 50 validated machine learning models, that is, 10 validated machine learning models for each machine learning classification algorithm. The MLRDS then determines an optimum algorithm decision threshold for each of the machine learning classification algorithms using the generated validated machine learning models.

FIG. 17 exemplarily illustrates a table 1701 containing outputs of the trained machine learning models, that is, the validated J48 models 1601a, 1602a, 1603a, 1604a, 1605a, . . . , 1609a, and 1610a obtained by the machine learning relationship determination system (MLRDS) on validating the trained machine learning models against the validation data set 1611 exemplarily illustrated in FIG. 16. The MLRDS generates the table 1701 on testing the 10 trained J48 models independently on the instances of the validation data set 1611 from the table 1501 exemplarily illustrated in FIGS. 15A-15B, and collecting the test outputs of the 10 trained J48 models. The table 1701 contains the test outputs of the 10 trained J48 models to the validation data set 1611 along with the expected output of the 10 trained J48 models given by the primary key-foreign key flag in the table 1401 exemplarily illustrated in FIGS. 14A-14B. The MLRDS also tabulates the YES COUNT parameter for every instance of the validation data set 1611 along with the % YES parameter given by (YES COUNT)*100/total number of the 10 trained J48 models.

Consider the first instance in the table 1701 identified with an ID 10001. The 10 trained J48 models are identified as M1, M2, M3, M4, M5, M6, M7, M8, M9, and M10 in the table 1701. The expected output of the 10 trained J48 models for the instance is given by the column ACTUAL PK-FK FLAG in the table 1701. For the ID 100001, the ACTUAL PK-FK FLAG is "N". The trained J48 models M1, M2, M3, M4, M5, M6, M7, M8, M9, and MIO predict the primary key-foreign key relationship for the first instance ID 10001 in the validation data set 1611 in the table 1701 as "N", "N", "Y", "Y", "N", "N", "N", "Y", "N", and "N" respectively. The machine learning relationship determination system (MLRDS) computes the YES COUNT parameter for the instance ID 100001 as 3 since the number of "Y" in the test outputs of the trained J48 models is 3. The MLRDS calculates the % YES parameter as 3*100/10=30%. The trained J48 model M1 outputs "N" and since the expected output is also "N" in the instance ID 100001, the test output of the trained J48 model M1 is a true negative. The trained J48 model M3 outputs "Y" and since the expected output is "N" in the instance ID 100001, the test output of the trained J48 model M3 is a false positive. Consider the instance with ID 100004 where the expected output is "Y". The trained J48 model M1 outputs "Y". The output of the trained J48 model M1 is a true positive since the test output and the expected output are both "Y". For the instance ID 100004, the trained J48 model M3 outputs "N" and since the expected output is "Y", the test output of the trained J48 model M3 is a false negative. The MLRDS tabulates the number of instances of the validation data set 1611 with true positive outputs and false positive outputs of the validated J48 models 1601a, 1602a, 1603a, 1604a, 1605a, . . . , 1609a, and 1610a exemplarily illustrated in FIG. 16. The MLRDS also computes and tabulates a cumulative number of true positive outputs and false positive outputs of the validated J48 models 1601a, 1602a, 1603a, 1604a, 1605a, . . . , 1609a, and 1610a for each %YES parameter ranging from 100% to 0% as exemplarily illustrated in FIGS. 18A-18C.

FIGS. 18A-18C exemplarily illustrate a table 1801 containing a cumulative number of instances of the validation data set 1611 exemplarily illustrated in FIG. 16, that defines a primary key-foreign relationship between the instances of the validation data set 1611 for determining the optimum algorithm decision threshold using the validated machine learning models, that is, the validated J48 models 1601a, 1602a, 1603a, 1604a, 1605a, . . . , 1609a, and 1610a exemplarily illustrated in FIG. 16. As exemplarily illustrated in FIG. 18A, the number of instances with % YES as 100 is 1. Therefore, the value in the column INSTANCE COUNT of the table 1801 for % YES as 100 is 1. The number of instances of the validation data set 1611 where the test output of the 10 validated J48 models 1601*a*, 1602*a*, 1603*a*, 1604*a*, 1605*a*, . . . , 1609*a*, and 1610*a* is a true positive is 1 and is indicated in the column ACTUAL Y of the table 1801. The number of instances of the validation data set 1611 where the test output of the 10 validated J48 models 1601*a*, 1602*a*, 1603*a*, 1604*a*, 1605*a*, . . . , 1609*a*, and 1610*a* is a false positive is ○ and is indicated in the column ACTUAL N of the table 1801. CUMULATIVE Y is a summation of values in the column ACTUAL Y in the table 1801. CUMULATIVE N is a summation of values in the column ACTUAL N in the table 1801. CUMULATIVE Y indicates the number of true positive outputs of the validated J48 models 1601*a*, 1602*a*, 1603*a*, 1604*a*, 1605*a*, . . . , 1609*a*, and 1610*a*. CUMULATIVE N indicates the number of false positive outputs of the validated J48 models 1601*a*, 1602*a*, 1603*a*, 1604*a*, 1605*a*, . . . , 1609*a*, and 1610*a*. The machine learning relationship determination system (MLRDS) uses the CUMULATIVE Y values and the CUMULATIVE N values to determine the optimum algorithm decision threshold. The maximum possible value of CUMULATIVE Y is 20 since the number of instances with an expected output "Y" in the validation data set 1611 in the table 1201 is 20 as disclosed in the description of FIG. 12. The maximum possible value of CUMULATIVE N is 560 since the number of instances with an expected output "N" in the validation data set 1611 in the table 1201 is 560. The MLRDS generates the table 1801 for the validated machine learning models generated for each of the machine learning classification algorithms.

Figure 19:
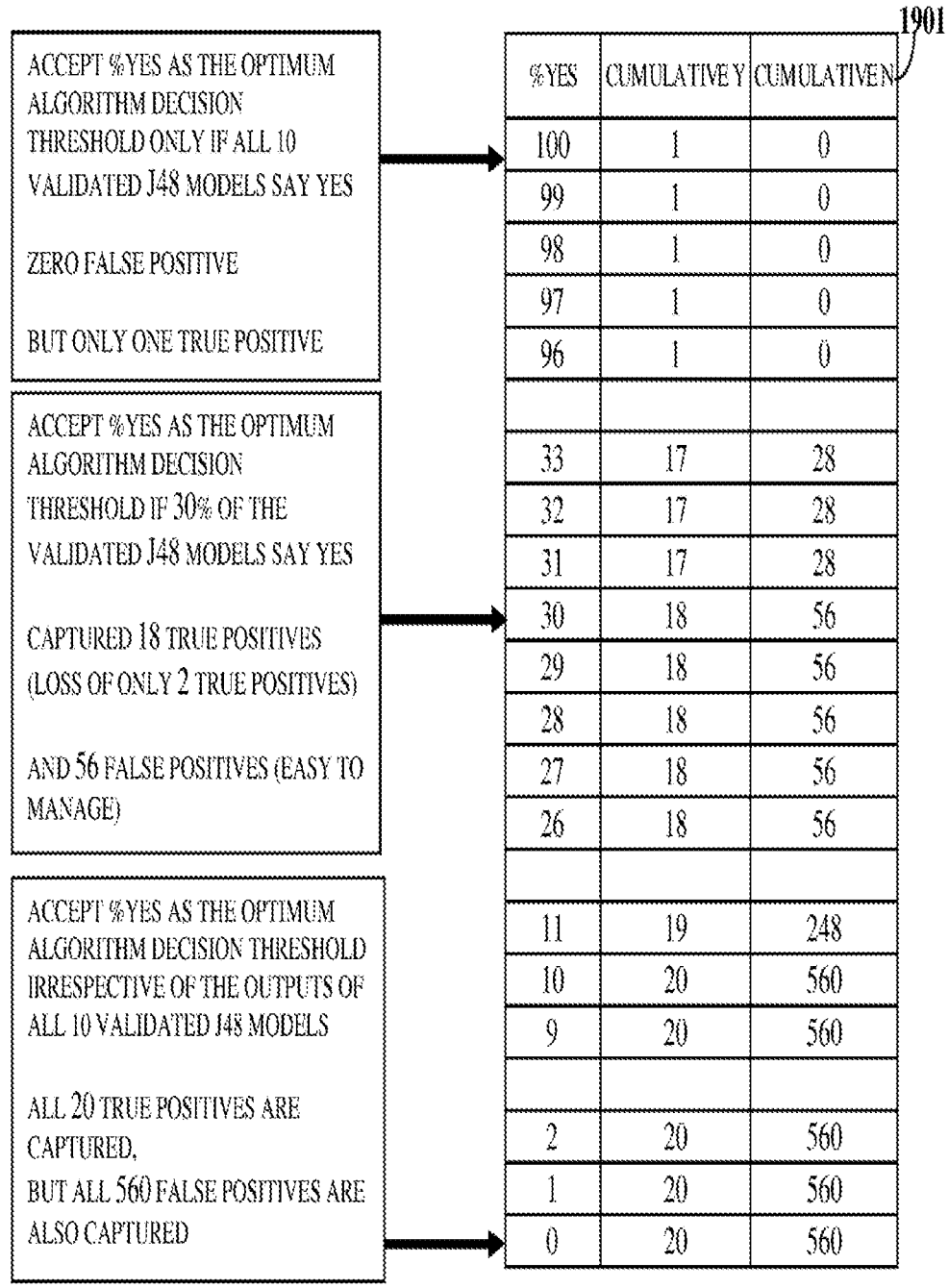
FIG. 19 exemplarily illustrates a schematic representation for determining an optimum algorithm decision threshold using the validated machine learning models.

FIG. 19 exemplarily illustrates a schematic representation for determining an optimum algorithm decision threshold using the validated machine learning models, that is, the validated J48 models 1601*a*, 1602*a*, 1603*a*, 1604*a*, 1605*a*, . . . , 1609*a*, and 1610*a* exemplarily illustrated in FIG. 16. In the table 1901, the values of CUMULATIVE Y and CUMULATIVE N are 1 and 0 respectively for % YES as 100. The number of true positive outputs for % YES as 0% is 20 and the number of false positive outputs is 560. Consider % YES as 30% with 18 true positive outputs and 56 false positive outputs. The % YES as 30% is a decision threshold that confirms an inclusion dependency pair of the prospective primary key and prospective foreign key identified from the tables T1 1001*a* and T2 1001*b* exemplarily illustrated in FIGS. 10A-10B, to be a primary key-foreign key pair only if 30% of the number of validated J48 models 1601*a*, 1602*a*, 1603*a*, 1604*a*, 1605*a*, . . . , 1609*a*, and 1610*a* output that the inclusion dependency pair is a primary key-foreign key pair. Since the number of validated J48 models 1601*a*, 1602*a*, 1603*a*, 1604*a*, 1605*a*, . . . , 1609*a*, and 1610*a* is 10, the decision threshold is 3 or more than 3 of the validated J48 models 1601*a*, 1602*a*, 1603*a*, 1604*a*, 1605*a*, . . . , 1609*a*, and 1610*a* must output that the inclusion dependency pair is a primary key-foreign key pair to confirm that the inclusion dependency pair is a primary key-foreign key pair.

With % YES as 0%, the machine learning relationship determination system (MLRDS) captures 20 true positive outputs and 560 false positive outputs. Filtering of the 560 false positive outputs is a tedious task as the false positive outputs indicate an inaccurate prediction of the primary key-foreign key pairs as non-primary key-foreign key pairs and vice versa. For % YES as 10%, that is, if at least one validated J48 model 1601*c* outputs a "Y", the MLRDS captures all the 580 instances of the validation data set 1611 exemplarily illustrated in FIG. 16, as "Y" with 20 true positive outputs and 560 false positive outputs. There are again spurious predictions whose filtration is a tedious task. For % YES as 30%, the number of true positive outputs is 18 and the number of false positive outputs is 56. Out of the 20 true positive instances in the validation data set 1611, 2 instances are lost, while 56 false positive outputs are manageable. For % YES as 31%, there are 28 false positive outputs and 3 true positive outputs are lost. On comparing % YES as 31% with % YES as 30%, the machine learning relationship determination system (MLRDS) allows a user to manually select 30% as the optimum % YES since losing a true positive output is less desirable than reducing the false positive outputs. That is, a correct prediction of a primary key-foreign key relationship is lost while trying to avoid the false prediction of the primary key-foreign key relationship. On comparing the number of true positive outputs and the number of false positive outputs for different % YES values, the optimum algorithm decision threshold is selected as 30%. When a new instance is to be classified by 10 validated machine learning models, for example, 1601*a*, 1602*a*, 1603*a*, 1604*a*, 1605*a*, . . . , 1609*a*, and 1610*a*, the MLRDS outputs "Y" only if a minimum 30% that is 3 out of the 10 validated machine learning models 1601*a*, 1602*a*, 1603*a*, 1604*a*, 1605*a*, . . . , 1609*a*, and 1610*a* say "Y" to the instance. The predictions of at least 3 of the validated J48 models 1601*a*, 1602*a*, 1603*a*, 1604*a*, 1605*a*, . . . , 1609*a*, and 1610*a* is considered correct and the MLRDS confirms the predicted primary key-foreign relationship as the primary key-foreign key relationship for the inclusion dependency pairs identified from the tables T1 1001*a* and T2 1001*b* exemplarily illustrated in FIGS. 10A-10B. The MLRDS determines the optimum algorithm decision threshold for each of the machine learning classification algorithms and stores the determined optimum algorithm decision thresholds in the threshold database.

The validated J48 models 1601*a*, 1602*a*, 1603*a*, 1604*a*, 1605*a*, . . . , 1609*a*, and 1610*a* and the optimum algorithm decision threshold of 3 are available for determining primary key-foreign key relationships between the inclusion dependency pairs identified from the tables T1 1001*a* and T2 1001*b*. The machine learning relationship determination system (MLRDS) determines a resultant of each inclusion dependency pair being a primary key-foreign key pair or a non-primary key-foreign key pair for each of the machine learning classification algorithms using the determined optimum algorithm decision threshold and the computed primary key-foreign key features of each inclusion dependency pair of the prospective primary key and the prospective foreign key identified from the tables T1 1001*a* and T2 1001*b*. The MLRDS inputs the computed primary key-foreign key features of the inclusion dependency pairs identified from the tables T1 1001*a* and T2 1001*b* into the 10 validated J48 models 1601*a*, 1602*a*, 1603*a*, 1604*a*, 1605*a*, . . . , 1609*a*, and 1610*a*. The 10 validated J48 models 1601*a*, 1602*a*, 1603*a*, 1604*a*, 1605*a*, . . . , 1609*a*, and 1610*a* output a prediction of the primary key-foreign key relationship as "Y" and "N" and the MLRDS tabulates the predictions.

FIG. 20 exemplarily illustrates a table 2001 showing resultants of the inclusion dependency pairs identified from the tables T1 1001*a* and T2 1001*b* shown in FIGS. 10A-10B, being primary key-foreign key pairs or non-primary key-foreign key pairs, generated by the machine learning relationship determination system (MLRDS) using the optimum algorithm decision threshold. Consider an example where 15 inclusion dependency pairs are identified from the tables T1 1001*a* and T2 1001*b*. For each inclusion dependency pair, the MLRDS tabulates the outputs of the validated J48 models 1601*a*, 1602*a*, 1603*a*, 1604*a*, 1605*a*, . . . , 1609*a*, and 1610*a* exemplarily illustrated in FIG. 16. The MLRDS computes the YES COUNT for each inclusion dependency pair. For instance ID 1, the validated J48 models 1601*a*, 1602*a*, 1603*a*, 1604*a*, 1605*a*, . . . , 1609*a*, and 1610*a* output "Y", "N", "N", "Y", "N", "N", "N", "Y", "N", and "N". The YES COUNT is 3. Since the optimum algorithm decision threshold is 3, the MLRDS confirms the YES output of the validated J48 models 1601*a*, 1602*a*, 1603*a*, 1604*a*, 1605*a*, . . . , 1609*a*, and 1610*a* indicated with a "Y" primary key-foreign key flag and generates a resultant "Y" confirming that the inclusion dependency pair with ID I is a primary key-foreign key pair. For the instance ID 4, the YES COUNT is I Since the YES COUNT is less than the optimum algorithm decision threshold, the MLRDS generates a resultant "N" confirming that the inclusion dependency pair with ID 4 is a non-primary key-foreign key pair. For the instance ID 3, the YES COUNT is 8. Since the YES COUNT is greater than the optimum algorithm decision threshold, the MLRDS generates a resultant "Y" confirming that the inclusion dependency pair with ID 3 is a primary key-foreign key pair. The MLRDS generates a similar table for the validated machine learning models generated for each of the other machine learning classification algorithms, for example, the Random Forest algorithm, the Naive Bayes algorithm, the k-Nearest Neighbors algorithm, and the support vector machine model. The MLRDS tabulates the resultants of the five machine learning classification algorithms for each of the inclusion dependency pairs identified from the tables T1 1001*a* and T2 1001*b*.

FIG. 21 exemplarily illustrates a table 2101 containing final resultants of the inclusion dependency pairs identified from the tables T1 1001*a* and T2 1001*b* shown in FIGS. 10A-10B, being primary key-foreign key pairs or non-primary key-foreign key pairs, generated by the machine learning relationship determination system (MLRDS) on performing majority voting on the resultants shown in FIG. 20. The MLRDS performs majority voting on the resultants of the machine learning classification algorithms and tabulates voting results in a column Y VOTE in the table 2101. For instance ID 4, the resultants of the J-48 algorithm, the Naive Bayesian algorithm, the k-Nearest Neighbors algorithm, the Random Forest algorithm, and the support vector machine model are "N", "Y", "Y", "N", and "N" respectively. On performing majority voting, the MLRDS determines that the number of machine learning classification algorithms with output as "Y" is 2, which is less than the number of machine learning classification algorithms with an output as "N". Since the majority is the number of machine learning classification algorithms with the output as "N", the MLRDS confirms that the inclusion dependency pair with ID 4 is a non-primary key-foreign key pair. For instance ID 5, the resultants of the J-48 algorithm, the Naive Bayes algorithm, the k-Nearest Neighbors algorithm, the Random Forest algorithm, and the support vector machine are "Y", "Y", "N", "Y", and "Y" respectively. On performing majority voting, the MLRDS determines that the number of machine learning classification algorithms with the output as "V" is 4, which is greater than the number of machine learning classification algorithms with the output as "N". Since the majority is the number of machine learning classification algorithms with the output as "Y", the MLRDS confirms that the inclusion dependency pair with ID 5 is a primary key-foreign key pair. Similarly, the primary key-foreign key relationships are determined for all the 15 inclusion dependency pairs identified from the tables T1 1001*a* and T2 1001*b*.

Figure 22:
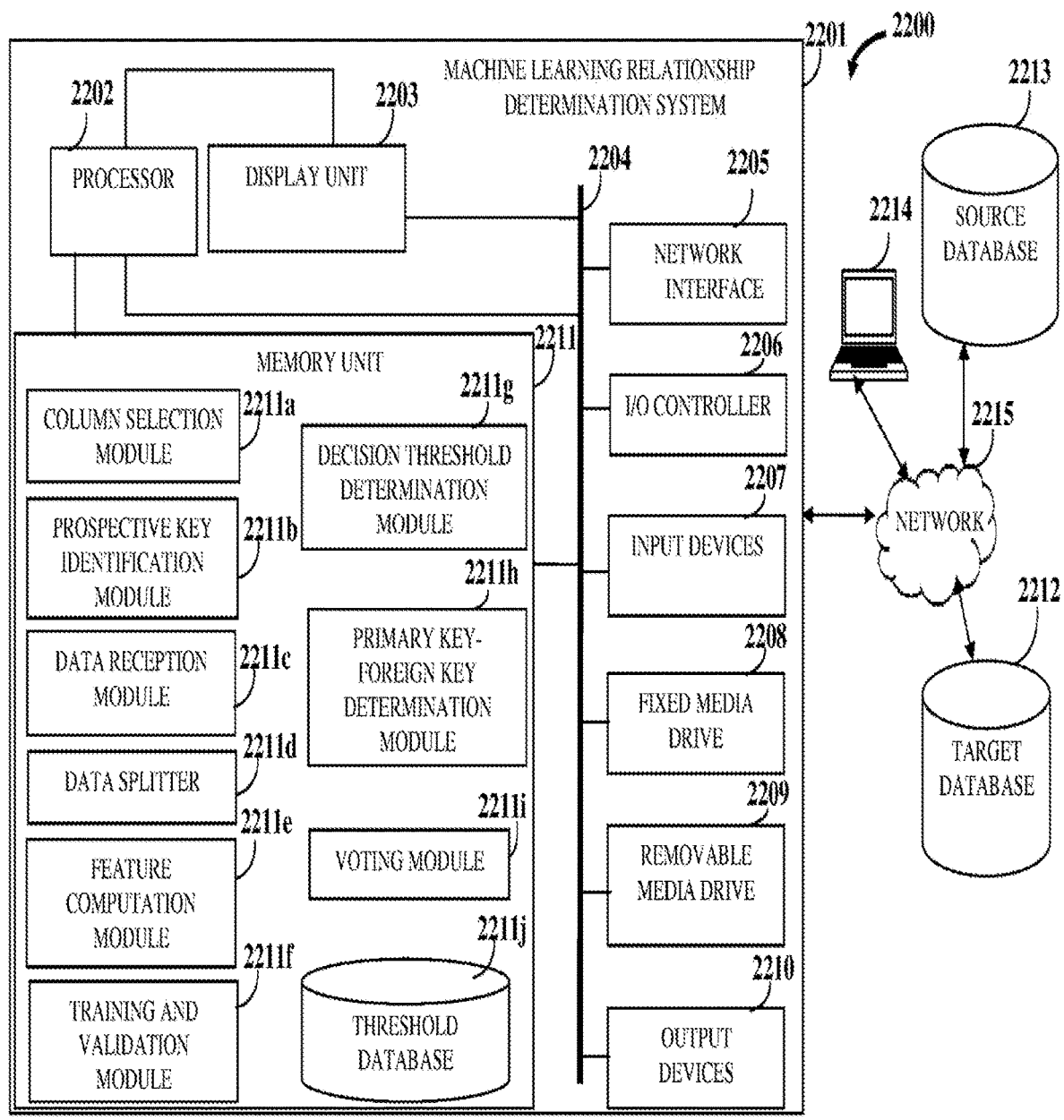
FIG. 22 exemplarily illustrates a system comprising the machine learning relationship determination system for determining primary key-foreign key relationships among data in multiple tables of a target database through machine learning.

FIG. 22 exemplarily illustrates a system 2200 comprising the machine learning relationship determination system (MLRDS) 2201 for determining primary key-foreign key relationships among data in multiple tables of a target database 2212 through machine learning. The MLRDS 2201 is a computer system that is programmable using a high level computer programming language. In an embodiment, the MLRDS 2201 uses programmed and purposeful hardware. The MLRDS 2201 is implemented on a computing device, for example, a personal computer, a tablet computing device, a mobile computer, a portable computing device, a laptop, a touch centric device, a workstation, a server, a portable electronic device, a network enabled computing device, an interactive network enabled communication device, any other suitable computing equipment, combinations of multiple pieces of computing equipment, etc. The MLRDS 2201 communicates with a user device 2214 via a network 2215, for example, a short range network or a long range network. The user device 2214 is an electronic device, for example, a personal computer, a tablet computing device, a mobile computer, a mobile phone, a smartphone, a portable computing device, a personal digital assistant, a laptop, a wearable computing device such as the Google Glass® of Google Inc., the Apple Watch® of Apple Inc., etc., a touch centric device, a client device, a portable electronic device, a network enabled computing device, an interactive network enabled communication device, any other suitable computing equipment, combinations of multiple pieces of computing equipment, etc. In an embodiment, the user device 2214 is a hybrid computing device that combines the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities.

The network 2215 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the machine learning relationship determination system (MLRDS) 2201 is accessible to a user, for example, through a broad spectrum of technologies and devices such as cellular phones, tablet computing devices, etc., with access to the internet.

As exemplarily illustrated in FIG. 22, the machine learning relationship determination system (MLRDS) 2201 comprises a non-transitory computer readable storage medium, for example, a memory unit 2211 for storing programs and data, and at least one processor 2202 communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 2202, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 2202, etc. The non-transitory computer readable storage medium is configured to store computer program instructions defined by modules, for example, 2211a, 2211b, 2211c, 2211d, 2211e, 2211f, 2211g, 2211h, 2211i, etc., of the MLRDS 2201. The modules, for example, 2211a, 2211b, 2211c, 2211d, 2211e, 2211f, 2211g, 2211h, 2211i, 2211j, etc., of the MLRDS 2201 are installed and stored in the memory unit 2211 of the MLRDS 2201. The memory unit 2211 is used for storing program instructions, applications, and data. The memory unit 2211 is, for example, a random access memory (RAM) or another type of dynamic storage device that stores information and instructions for execution by the processor 2202. The memory unit 2211 also stores temporary variables and other intermediate information used during execution of the instructions by the processor 2202. The MLRDS 2201 further comprises a read only memory (ROM) or another type of static storage device that stores static information and instructions for the processor 2202.

The processor 2202 is configured to execute the computer program instructions defined by the machine learning relationship determination system (MLRDS) 2201. The processor 2202 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 2202 is implemented as a processor set comprising, for example, a programmed microprocessor and a math or graphics co-processor. The processor 2202 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The MLRDS 2201 disclosed herein is not limited to employing a processor 2202. In an embodiment, the MLRDS 2201 employs a controller or a microcontroller. The processor 2202 executes the modules, for example, 2211a, 2211b, 2211c, 2211d, 2211e, 2211f, 2211g, 2211h, 2211i, etc., of the MLRDS 2201.

As exemplarily illustrated in FIG. 22, the machine learning relationship determination system (MLRDS) 2201 further comprises a data bus 2204, a network interface 2205, an input/output (I/O) controller 2206, input devices 2207, a fixed media drive 2208 such as a hard drive, a removable media drive 2209 for receiving removable media, output devices 2210, etc. The data bus 2204 permits communications between the modules, for example, 2202, 2203, 2204, 2205, 2206, 2207, 2208, 2209, 2210, 2211, etc., of the MLRDS 2201. The network interface 2205 enables connection of the MLRDS 2201 to the network 2215. In an embodiment, the network interface 2205 is provided as an interface card also referred to as a "line card". The network interface 2205 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 2206 controls input actions and output actions performed by the MLRDS 2201.

The display unit 2203 comprises, for example, a video display, a liquid crystal display, a plasma display, an organic light emitting diode (OLED) based display, etc. The display screen 2203 displays a graphical user interface. The input devices 2207 are used for routine maintenance of the MLRDS 2201. The input devices 2207 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

The modules of the machine learning relationship determination system (MLRDS) 2201 comprise a column selection module 2211a, a prospective key identification module 2211b, a data reception module 2211c, a data splitter 2211d, a feature computation module 2211e, a training and validation module 2211f, a decision threshold determination module 2211g, a primary key-foreign key determination module 2211h, and a voting module 2211i stored in the memory unit 2211 of the MLRDS 2201. The column selection module 2211a selects a first column of data from a first table among the multiple tables and a second column of data from a second table among the multiple tables for each of the multiple tables in the target database 2212 as disclosed in the detailed description of FIGS. 1A-1B. The prospective key identification module 2211b identifies the selected first column of data as a prospective primary key and the selected second column of data as a prospective foreign key to form an inclusion dependency pair on determining presence of data elements of the selected second column of data in the selected first column of data in their entirety as disclosed in the detailed description of FIGS. 1A-1B. The data reception module 2211c receives multiple predetermined inclusion dependency pairs comprising primary key-foreign key pairs classified as positive training data and positive validation data, and non-primary key-foreign key pairs classified as negative training data and negative validation data from a source database 2213. The positive validation data and the negative validation data form a validation data set. The data splitter 2211*d* splits the positive training data and the negative training data into training data sets. The feature computation module 2211*e* computes primary key-foreign key features comprising, for example, a normalized rank sum, a unique foreign key ratio, a unique foreign share, a name similarity index, a name pattern acceptance, a distribution displacement, and an element count ratio for the inclusion dependency pair of the prospective primary key and the prospective foreign key, the training data sets, and the validation data set as disclosed in the detailed description of FIGS. 1A-1B.

The training and validation module 2211*f* generates trained machine learning models corresponding to the training data sets by training each of the machine learning classification algorithms using the training data sets and the computed primary key-foreign key features of the training data sets as disclosed in the detailed description of FIGS. 1A-1B. The training and validation module 2211*f* also generates validated machine learning models for each of the machine learning classification algorithms on testing the generated trained machine learning models corresponding to the training data sets with the validation data set using the computed primary key-foreign key features of the validation data set as disclosed in the detailed description of FIGS. 1A-1B. The training and validation module 2211*f* generates the validated machine learning models for each of the machine learning classification algorithms when the generated trained machine learning models corresponding to the training data sets meet a predetermined criterion, that is, an acceptable accuracy on testing the generated trained machine learning models with the validation data set. The training and validation module 2211*f* retrains the generated trained machine learning models on the training data sets until the generated trained machine learning models meet the acceptable accuracy for the generation of the validated machine learning models for each of the machine learning classification algorithms as disclosed in the detailed description of FIG. 2.

The decision threshold determination module 2211*g* determines an optimum algorithm decision threshold for each of the machine learning classification algorithms using the generated validated machine learning models as disclosed in the detailed description of FIGS. 1A-1B. The primary key-foreign key determination module 2211*h* determines a resultant of the inclusion dependency pair of the prospective primary key and the prospective foreign key being a primary key-foreign key pair or a non-primary key-foreign key pair for each of the machine learning classification algorithms using the determined optimum algorithm decision threshold and the computed primary key-foreign key features of the inclusion dependency pair of the prospective primary key and the prospective foreign key as disclosed in the detailed description of FIGS. 1A-1B. The decision threshold determination module 2211*g* stores the determined optimum algorithm decision threshold for each of the machine learning classification algorithms in a threshold database 2211*j*. The voting module 2211*i* performs majority voting on the determined resultant for each of the machine learning classification algorithms to determine a primary key-foreign key relationship among the data in the selected first column of data of the first table and the selected second column of data of the second table as disclosed in the detailed description of FIGS. 1A-1B.

The machine learning relationship determination system (MLRDS) 2201 receives a selection of a combination of machine learning classification algorithms from the user device 2214 via the network 2215. A user can select any number of machine learning classification algorithms from a predefined set of machine learning classification algorithms. The MLRDS 2201 also receives user input from the user device 2214 via the network 2215 for configuring the predetermined criterion, that is, the acceptable accuracy to be met by the trained machine learning models when the trained machine learning models are tested against the validation data set to qualify as validated machine learning models. The MLRDS 2201 also receives a user selection of the optimum algorithm decision threshold between 0% and 100% extreme conditions of % YES from the user device 2214 via the network 2215.

The threshold database 2211*j* of the machine learning relationship determination system (MLRDS) 2201 can be any storage area or medium that can be used for storing data and files. In an embodiment, the threshold database 2211*j* is an external database apart from the target database 2212 and the source database 2213, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the threshold database 2211*j* can also be a location on a file system. In another embodiment, the threshold database 2211*j* can be remotely accessed by the MLRDS 2201 via the network 2215 along with the target database 2212 and the source database 2213. In another embodiment, the threshold database 2211*j*, the source database 2213, and the target database 2212 are configured as a cloud based database implemented in a cloud computing environment, where computing resources are delivered as a service over the network 2215.

Computer applications and programs are used for operating the machine learning relationship determination system (MLRDS) 2201. The programs are loaded onto the fixed media drive 2208 and into the memory unit 2211 of the MLRDS 2201 via the removable media drive 2209. In an embodiment, the computer applications and programs may be loaded directly on the MLRDS 2201 via the network 2215. The processor 2202 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The MLRDS 2201 employs the operating system for performing multiple tasks. The operating system is responsible for management and coordination of activities and sharing of resources of the MLRDS 2201. The operating system further manages security of the MLRDS 2201, peripheral devices connected to the MLRDS 2201, and network connections. The operating system employed on the MLRDS 2201 recognizes, for example, inputs provided by a user of the MLRDS 2201 using one of the input devices 2207, the output devices 2210, files, and directories stored locally on the fixed media drive 2208. The operating system on the MLRDS 2201 executes different programs using the processor 2202. The processor 2202 and the operating system together define a computer platform for which application programs in high level programming languages are written.

The processor 2202 retrieves instructions defined by the column selection module 2211a, the prospective key identification module 2211b, the data reception module 2211c, the data splitter 2211d, the feature computation module 2211e, the training and validation module 2211f, the decision threshold determination module 2211g, the primary key-foreign key determination module 2211h, and the voting module 2211i stored in the memory unit 2211 of the machine learning relationship determination system (MLRDS) 2201, for performing respective functions disclosed above. The processor 2202 retrieves instructions for executing the modules, for example, 2211a, 2211b, 2211c, 2211d, 2211e, 2211f, 2211g, 2211h, 2211i, etc., of the MLRDS 2201 from the memory unit 2211. A program counter determines the location of the instructions in the memory unit 2211. The program counter stores a number that identifies the current position in the program of each of the modules, for example, 2211a, 2211b, 2211c, 2211d, 2211e, 2211f, 2211g, 2211h, 2211i, etc., of the MLRDS 2201. The instructions fetched by the processor 2202 from the memory unit 2211 after being processed are decoded. The instructions are stored in an instruction register in the processor 2202. After processing and decoding, the processor 2202 executes the instructions, thereby performing one or more processes defined by those instructions.

At the time of execution, the instructions stored in the instruction register are examined to determine the operations to be performed. The processor 2202 then performs the specified operations. The operations comprise arithmetic operations and logic operations. The operating system performs multiple routines for performing a number of tasks required to assign the input devices 2207, the output devices 2210, and the memory unit 2211 for execution of the modules, for example, 2211a, 2211b, 2211c, 2211d, 2211e, 2211f, 2211g, 2211h, 2211i, etc., of the machine learning relationship determination system (MLRDS) 2201. The tasks performed by the operating system comprise, for example, assigning memory to the modules, for example, 2211a, 2211b, 2211c, 2211d, 2211e, 2211f, 2211g, 2211h, 2211i, etc., of the MLRDS 2201 and to data used by the MLRDS 2201, moving data between the memory unit 2211 and disk units, and handling input/output operations. The operating system performs the tasks on request by the operations and after performing the tasks, the operating system transfers the execution control back to the processor 2202. The processor 2202 continues the execution to obtain one or more outputs. The outputs of the execution of the modules, for example, 2211a, 2211b, 2211c, 2211d, 2211e, 2211f, 2211g, 2211h, 2211i, etc., of the MLRDS 2201 are displayed to a user of the MLRDS 2201 on the output device 2210.

The non-transitory computer readable storage medium disclosed herein stores computer program codes comprising instructions executable by at least one processor 2202 for determining primary key-foreign key relationships among data in tables of the target database 2212 through machine learning. The computer program codes comprise a first computer program code for selecting a first column of data from a first table among the tables and a second column of data from a second table among the tables for each of the tables in the target database 2212; a second computer program code for identifying the selected first column of data as a prospective primary key and the selected second column of data as a prospective foreign key to form an inclusion dependency pair on determining presence of data elements of the selected second column in the selected first column in their entirety; a third computer program code for receiving predetermined inclusion dependency pairs comprising primary key-foreign key pairs classified as positive training data and positive validation data and non-primary key-foreign key pairs classified as negative training data and negative validation data from the source database 2213; a fourth computer program code for splitting the positive training data and the negative training data into training data sets; a fifth computer program code for computing primary key-foreign key features for the inclusion dependency pair of the prospective primary key and the prospective foreign key, the training data sets, and the validation data set; a sixth computer program code for generating trained machine learning models corresponding to the training data sets by training each of the machine learning classification algorithms using the training data sets and the computed primary key-foreign key features of the training data sets; a seventh computer program code for generating validated machine learning models for each of the machine learning classification algorithms on testing the generated trained machine learning models corresponding to the training data sets with the validation data set using the computed primary key-foreign key features of the validation data set; an eighth computer program code for determining an optimum algorithm decision threshold for each of the machine learning classification algorithms using the generated validated machine learning models; a ninth computer program code for determining a resultant of the inclusion dependency pair being a primary key-foreign key pair or a non-primary key-foreign key pair for each of the machine learning classification algorithms using the determined optimum algorithm decision threshold and the computed primary key-foreign key features of the inclusion dependency pair of the prospective primary key and the prospective foreign key; and a tenth computer program code for performing majority voting on the determined resultant for each of the machine learning classification algorithms to determine a primary key-foreign key relationship among the data in the selected first column of data of the first table and the selected second column of data of the second table.

In an embodiment, the seventh computer program code comprises an eleventh computer program code for generating the validated machine learning models for each of the machine learning classification algorithms when the generated trained machine learning models corresponding to the training data sets meet a predetermined criterion on testing the generated trained machine learning models with the validation data set. In this embodiment, the sixth computer program code comprises a twelfth computer program code for retraining the generated trained machine learning models on the training data sets until the generated trained machine learning models meet the predetermined criterion for the generation of the validated machine learning models for each of the machine learning classification algorithms.

The computer program codes further comprise one or more additional computer program codes for performing additional steps that may be required and contemplated for determining primary key-foreign key relationships among data in the tables of the target database 2212. In an embodiment, a single piece of computer program code comprising computer executable instructions performs one or more steps of the method disclosed herein for determining primary key-foreign key relationships among data in the tables of the target database 2212. The computer program codes comprising computer executable instructions are embodied on the non-transitory computer readable storage medium. The processor 2202 of the machine learning relationship determination system (MLRDS) 2201 retrieves these computer executable instructions and executes them. When the computer executable instructions are executed by the processor 2202, the computer executable instructions cause the processor 2202 to perform the steps of the method for determining primary key-foreign key relationships among data in the tables of the target database 2212.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the machine learning relationship determination system (MLRDS) 2201 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the MLRDS 2201 disclosed herein are implemented as programmed elements, or non-programmed elements, or any suitable combination thereof.

Where databases are described such as the threshold database 2211*j*, the target database 2212, and the source database 2213, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the machine learning relationship determination system (MLRDS) 2201, the databases are integrated to communicate with each other for enabling simultaneous updates of data linked across the databases, when there are any updates to the data in one of the databases.

The method and the machine learning relationship determination system (MLRDS) 2201 disclosed herein can be configured to work in a network environment comprising one or more computers that are in communication with one or more devices via the network 2215. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 2215. Each of the computers and the devices executes an operating system, examples of which are disclosed above. While the operating system may differ depending on the type of computer, the operating system provides the appropriate communications protocols to establish communication links with the network 2215. Any number and type of machines may be in communication with the computers.

The method and the machine learning relationship determination system (MLRDS) 2201 disclosed herein are not limited to a particular computer system platform, processor, operating system, or network. In an embodiment, one or more aspects of the method and the MLRDS 2201 disclosed herein are distributed among one or more computer systems, for example, servers configured to provide one or more services to one or more client computers, or to perform a complete task in a distributed system. For example, one or more aspects of the method and the MLRDS 2201 disclosed herein are performed on a client-server system that comprises components distributed among one or more server systems that perform multiple functions according to various embodiments. These components comprise, for example, executable, intermediate, or interpreted code, which communicate over the network 2215 using a communication protocol. The method and the machine learning relationship determination system (MLRDS) 2201 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the machine learning relationship determination system (MLRDS) 2201 disclosed herein. While the method and the MLRDS 2201 have been described with reference to various embodiments, it is understood that the words, which have been used herein, are words of description and illustration, rather than words of limitation. Further, although the method and the MLRDS 2201 have been described herein with reference to particular means, materials, and embodiments, the method and the MLRDS 2201 are not intended to be limited to the particulars disclosed herein; rather, the method and the MLRDS 2201 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the MLRDS 2201 disclosed herein in their aspects.

What is claimed is:

1. A method for determining primary key-foreign key relationships among data in a plurality of tables of a target database through machine learning, the method employing a machine learning relationship determination system comprising at least one processor configured to execute computer program instructions for performing the method comprising:
    selecting a first column of data from a first table among the tables and a second column of data from a second table among the tables for each of the tables in the target database by the machine learning relationship determination system;
    identifying the selected first column of data as a prospective primary key and the selected second column of data as a prospective foreign key to form an inclusion dependency pair;
    receiving a plurality of predetermined inclusion dependency pairs comprising primary key-foreign key pairs classified as positive training data and positive validation data, and non-primary key-foreign key pairs classified as negative training data and negative validation data, by the machine learning relationship determination system, wherein the positive validation data and the negative validation data form a validation data set;
    splitting the positive training data and the negative training data into training data sets by the machine learning relationship determination system;
    computing a plurality of primary key-foreign key features for the inclusion dependency pair of the prospective primary key and the prospective foreign key, the training data sets, and the validation data set by the machine learning relationship determination system;
    generating trained machine learning models corresponding to the training data sets by the machine learning relationship determination system by training each of one or more machine learning classification algorithms using the training data sets and the computed primary key-foreign key features of the training data sets;
    generating validated machine learning models for the each of the one or more machine learning classification algorithms by the machine learning relationship determination system based on the generated trained machine learning models;
    determining an algorithm decision threshold for the each of the one or more machine learning classification algorithms by the machine learning relationship determination system using the generated validated machine learning models;
    determining a resultant of the inclusion dependency pair being one of a primary key-foreign key pair and a non-primary key-foreign key pair by the machine learning relationship determination system for the each of the one or more machine learning classification algorithms using the determined algorithm decision threshold and the computed primary key-foreign key features of the inclusion dependency pair of the prospective primary key and the prospective foreign key; and
    performing majority voting on the determined resultant for the each of the one or more machine learning classification algorithms by the machine learning relationship determination system to determine a primary key-foreign key relationship among the data in the selected first column of data of the first table and the selected second column of data of the second table.

2. The method of claim 1, wherein the validated machine learning models for the each of the one or more machine learning classification algorithms are generated by the machine learning relationship determination system when the generated trained machine learning models corresponding to the training data sets meet a predetermined criterion on testing the generated trained machine learning models with the validation data set.

3. The method of claim 2, further comprising retraining the generated trained machine learning models on the training data sets until the generated trained machine learning models meet the predetermined criterion for the generation of the validated machine learning models for the each of the one or more machine learning classification algorithms.

4. The method of claim 1, wherein the determined algorithm decision threshold for the each of the one or more machine learning classification algorithms is stored in a threshold database by the machine learning relationship determination system.

5. The method of claim 1, wherein the primary key-foreign key features comprise a normalized rank sum, a unique foreign key ratio, a unique foreign share, a name similarity index, a name pattern acceptance, a distribution displacement, and an element count ratio.

6. The method of claim 1, wherein the primary key-foreign key features for the inclusion dependency pair of the prospective primary key and the prospective foreign key are computed by the machine learning relationship determination system using one of a plurality of items selected from the group consisting of data elements of the prospective primary key identified by the selected first column of data, the data elements of the prospective foreign key identified by the selected second column of data, a number of unique data elements of the prospective foreign key, Levenshtein distance between names of the prospective primary key and the prospective foreign key, a prefix matching score obtained from the names of the prospective primary key and the prospective foreign key, sound codes obtained by applying a Metaphone algorithm on the names of the prospective primary key and the prospective foreign key, patterns of the names of the prospective primary key and the prospective foreign key, statistical measures, and any combination thereof.

7. The method of claim 1, wherein the one or more machine learning classification algorithms comprise J48 algorithm, k-Nearest Neighbors algorithm, Naive Bayes algorithm, Random Forest algorithm, Bayes network model, a multilayer perceptron model, and a support vector machine model.

8. A system for determining primary key foreign key relationships among data in a plurality of tables of a target database, the system comprising:
  a non-transitory computer readable storage medium configured to store computer program instructions; and
  at least one processor connected to the non-transitory computer readable storage medium, the computer program instructions when executed by the at least one processor configure the system to:
  select a first column of data from a first table among the tables and a second column of data from a second table among the tables for each of the tables in the target database;
  identify the selected first column of data as a prospective primary key and the selected second column of data as a prospective foreign key to form an inclusion dependency pair;
  receive a plurality of predetermined inclusion dependency pairs comprising primary key-foreign key pairs classified as positive training data and positive validation data, and non primary key-foreign key pairs classified as negative training data and negative validation data, wherein the positive validation data and the negative validation data form a validation data set;
  split the positive training data and the negative training data into training data sets;
  compute a plurality of primary key-foreign key features for the inclusion dependency pair of the prospective primary key and the prospective foreign key, the training data sets, and the validation data set;
  generate trained machine learning models corresponding to the training data sets by training each of one or more machine learning classification algorithms using the training data sets and the computed primary key-foreign key features of the training data sets;
  generate validated machine learning models for the each of the one or more machine learning classification algorithms based on the generated trained machine learning models;
  determine an algorithm decision threshold for the each of the one or more machine learning classification algorithms using the generated validated machine learning models;
  determine a resultant of the inclusion dependency pair being one of a primary key foreign key pair and a non-primary key-foreign key pair for the each of the one or more machine learning classification algorithms using the determined algorithm decision threshold and the computed primary key foreign key features of the inclusion dependency pair of the prospective primary key and the prospective foreign key; and
  perform majority voting on the determined resultant for the each of the one or more machine learning classification algorithms to determine a primary key-foreign key relationship among the data in the selected first column of data of the first table and the selected second column of data of the second table.

9. The machine learning relationship determination system of claim 8, wherein the system is further configured to generate the validated machine learning models for the each of the one or more machine learning classification algorithms when the generated trained machine learning models corresponding to the training data sets meet a predetermined criterion on testing the generated trained machine learning models with the validation data set.

10. The machine learning relationship determination system of claim 9, wherein the system is further configured to retrain the generated trained machine learning models on the training data sets until the generated trained machine learning models meet the predetermined criterion for the generation of the validated machine learning models for the each of the one or more machine learning classification algorithms.

11. The machine learning relationship determination system of claim 8, wherein the system is further configured to store the determined algorithm decision threshold for the each of the one or more machine learning classification algorithms in a threshold database.

12. The machine learning relationship determination system of claim 8, wherein the primary key-foreign key features comprise a normalized rank sum, a unique foreign key ratio, a unique foreign share, a name similarity index, a name pattern acceptance, a distribution displacement, and an element count ratio.

13. The machine learning relationship determination system of claim 8, wherein the system is further configured to compute the primary key-foreign key features for the inclusion dependency pair of the prospective primary key and the prospective foreign key using one of a plurality of items selected from the group consisting of data elements of the prospective primary key identified by the selected first column of data, the data elements of the prospective foreign key identified by the selected second column of data, a number of unique data elements of the prospective foreign key, Levenshtein distance between names of the prospective primary key and the prospective foreign key, a prefix matching score obtained from the names of the prospective primary key and the prospective foreign key, sound codes obtained by applying a Metaphone algorithm on the names of the prospective primary key and the prospective foreign key, patterns of the names of the prospective primary key and the prospective foreign key, statistical measures, and any combination thereof.

14. The machine learning relationship determination system of claim 8, wherein the one or more machine learning classification algorithms comprise J48 algorithm, k-Nearest Neighbors algorithm, Naive Bayes algorithm, Random Forest algorithm, Bayes network model, a multilayer perceptron model, and a support vector machine model.

15. A non-transitory computer readable storage medium having stored thereon instructions for causing one or more processing units to execute a process for determining primary key-foreign key relationships among data in a plurality of tables of a target database, the process comprising:
  selecting a first column of data from a first table among the tables and a second column of data from a second table among the tables for each of the tables in the target database;

identifying the selected first column of data as a prospective primary key and the selected second column of data as a prospective foreign key to form an inclusion dependency pair;

receiving a plurality of predetermined inclusion dependency pairs comprising primary key-foreign key pairs classified as positive training data and positive validation data, and non-primary key-foreign key pairs classified as negative training data and negative validation data, wherein the positive validation data and the negative validation data form a validation data set;

splitting the positive training data and the negative training data into training data sets;

computing a plurality of primary key-foreign key features for the inclusion dependency pair of the prospective primary key and the prospective foreign key, the training data sets, and the validation data set;

generating trained machine learning models corresponding to the training data sets by training each of one or more machine learning classification algorithms using the training data sets and the computed primary key-foreign key features of the training data sets;

generating validated machine learning models for the each of the one or more machine learning classification algorithms based on the generated trained machine learning models;

determining an algorithm decision threshold for the each of the one or more machine learning classification algorithms using the generated validated machine learning models;

determining a resultant of the inclusion dependency pair being one of a primary key-foreign key pair and a non-primary key-foreign key pair for the each of the one or more machine learning classification algorithms using the determined algorithm decision threshold and the computed primary key-foreign key features of the inclusion dependency pair of the prospective primary key and the prospective foreign key; and performing majority voting on the determined resultant for the each of the one or more machine learning classification algorithms to determine a primary key-foreign key relationship among the data in the selected first column of data of the first table and the selected second column of data of the second table.

16. The non-transitory computer readable storage medium of claim 15, wherein the process further comprises generating the validated machine learning models for the each of the one or more machine learning classification algorithms when the generated trained machine learning models corresponding to the training data sets meet a predetermined criterion on testing the generated trained machine learning models with the validation data set.

17. The non-transitory computer readable storage medium of claim 16, wherein the process further comprises retraining the generated trained machine learning models on the training data sets until the generated trained machine learning models meet the predetermined criterion for the generation of the validated machine learning models for the each of the one or more machine learning classification algorithms.

18. The non-transitory computer readable storage medium of claim 15, wherein the primary key-foreign key features comprise a normalized rank sum, a unique foreign key ratio, a unique foreign share, a name similarity index, a name pattern acceptance, a distribution displacement, and an element count ratio.

* * * * *